(12) United States Patent
Young et al.

(10) Patent No.: US 11,618,641 B2
(45) Date of Patent: Apr. 4, 2023

(54) APPARATUS FOR USE IN UNPACKING SHIPPING CONTAINERS

(71) Applicant: YGCC Holdings Pty Ltd, East Brisbane (AU)

(72) Inventors: Trent Young, East Brisbane (AU); Scott Young, East Brisbane (AU)

(73) Assignee: YGCC Holdings Pty Ltd, East Brisbane (AU)

( * ) Notice: Subject to any disclaimer, the term of this patent is extended or adjusted under 35 U.S.C. 154(b) by 0 days.

(21) Appl. No.: 17/513,338

(22) Filed: Oct. 28, 2021

(65) Prior Publication Data

US 2022/0048718 A1 Feb. 17, 2022

Related U.S. Application Data

(63) Continuation of application No. 16/165,276, filed on Oct. 19, 2018, now Pat. No. 11,192,733.

(30) Foreign Application Priority Data

Oct. 20, 2017 (AU) .................................. 2017904246
Mar. 26, 2018 (AU) .................................. 2018901003

(51) Int. Cl.
*B65G 67/24* (2006.01)
*B65G 67/04* (2006.01)
*B65G 67/02* (2006.01)
*B65G 67/20* (2006.01)

(52) U.S. Cl.
CPC ............. *B65G 67/24* (2013.01); *B65G 67/02* (2013.01); *B65G 67/04* (2013.01); *B65G 67/20* (2013.01); *B65G 2201/0267* (2013.01)

(58) Field of Classification Search
CPC ........ B65G 67/24; B65G 67/02; B65G 67/04; B65G 67/20; B65G 2201/0267
See application file for complete search history.

(56) References Cited

U.S. PATENT DOCUMENTS

| | | |
|---|---|---|
| 3,402,845 A | 9/1968 | Eriksson |
| 3,811,579 A | 5/1974 | Black |
| 3,961,714 A | 6/1976 | Buehler |
| 4,108,455 A | 8/1978 | James |
| 4,784,287 A | 11/1988 | Yamada et al. |
| 4,880,342 A | 11/1989 | Pradovic |
| 4,986,706 A | 1/1991 | Williams, Jr. |
| 5,566,530 A | 10/1996 | Johnstone et al. |

(Continued)

*Primary Examiner* — Kaitlin S Joerger
(74) *Attorney, Agent, or Firm* — Hovey Williams LLP

(57) ABSTRACT

An apparatus (600) for use in unpacking or packing shipping containers (700) includes at least one barrier part which provides a barrier to wheeled powered material handling equipment (1105). The barrier part can be positioned substantially transversely across an interior of a shipping container (700) at a desired position along the length of the interior of the shipping container, to provide a working area (1120) within the shipping container in which personnel may work on foot, and substantially impede or prevent entry of wheeled powered material handling equipment into the working area. The apparatus may be provided with an arrangement to substantially maintain its location in the desired position against forces resulting from impact by the powered material handling equipment operating within the shipping container.

19 Claims, 17 Drawing Sheets

(56) References Cited

U.S. PATENT DOCUMENTS

| | | | |
|---|---|---|---|
| 5,577,873 A * | 11/1996 | Tanaka | B66F 9/18 |
| | | | 414/400 |
| 5,810,186 A | 9/1998 | Lam | |
| 6,206,623 B1 | 3/2001 | Podd | |
| 8,668,425 B2 | 3/2014 | Adams et al. | |
| 8,739,996 B2 | 6/2014 | Looker | |
| 8,784,031 B2 | 7/2014 | Williams | |
| 9,233,773 B2 | 1/2016 | Downey et al. | |
| 9,546,013 B2 | 1/2017 | Downey et al. | |
| 9,604,797 B2 * | 3/2017 | Heitplatz | B65G 67/08 |
| 9,623,569 B2 | 4/2017 | McCollum et al. | |
| 9,950,877 B2 | 4/2018 | Thompson et al. | |
| 9,969,573 B2 * | 5/2018 | Girtman | B65G 67/24 |
| 10,204,247 B1 | 2/2019 | Hamer et al. | |
| 10,315,866 B2 | 6/2019 | Yuvarej et al. | |
| 10,336,562 B2 | 7/2019 | Girtman et al. | |
| 10,343,858 B2 | 7/2019 | McMurrough et al. | |
| 2003/0146212 A1 | 8/2003 | Mai et al. | |
| 2008/0298940 A1 | 12/2008 | Cleasby et al. | |
| 2010/0147728 A1 | 6/2010 | Guiles | |
| 2010/0296902 A1 | 11/2010 | Aschpurwis et al. | |
| 2011/0058922 A1 * | 3/2011 | Auriemma | B65G 67/20 |
| | | | 414/400 |
| 2012/0087760 A1 | 4/2012 | Sims | |
| 2016/0264366 A1 | 9/2016 | Heitplalz | |
| 2018/0118476 A1 | 5/2018 | Bastian, II et al. | |
| 2018/0194574 A1 | 7/2018 | Wagner et al. | |
| 2018/0194575 A1 | 7/2018 | Anderson | |
| 2018/0326594 A1 | 11/2018 | McCollum et al. | |

* cited by examiner

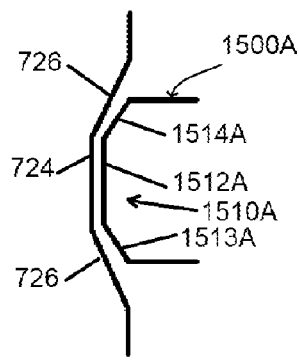
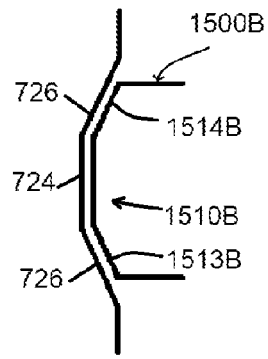
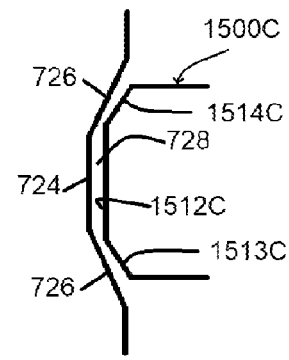
Figure 15(a)　　　Figure 15(b)　　　Figure 15(c)
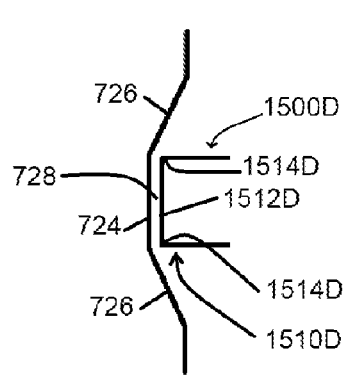
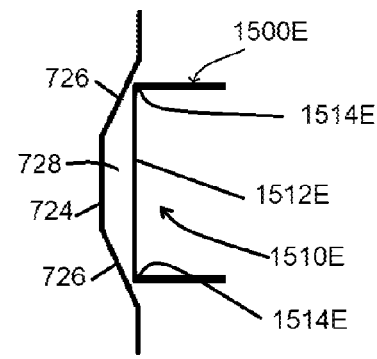
Figure 15(d)　　　Figure 15(e)
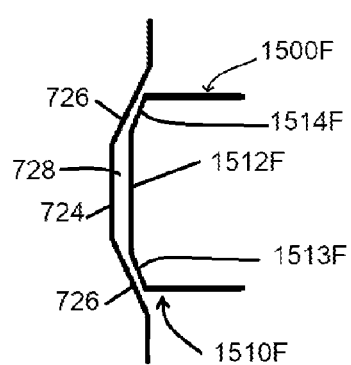
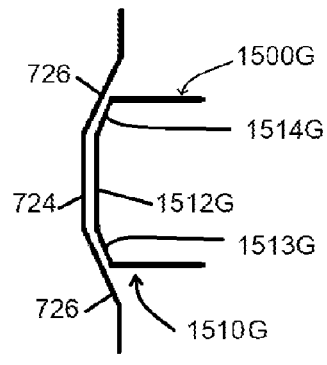
Figure 15(f)　　　Figure 15(g)

APPARATUS FOR USE IN UNPACKING SHIPPING CONTAINERS

RELATED APPLICATIONS

This application is a continuation of U.S. Ser. No. 16/165,276, entitled APPARATUS FOR USE IN UNPACKING SHIPPING CONTAINERS, filed Oct. 19, 2018, which claims the priority benefit of Australian Provisional Application No. 2017904246, entitled APPARATUS FOR USE IN UNPACKING SHIPPING CONTAINERS, filed Oct. 20, 2017, and Australian Provisional Application No. 2018901003, entitled APPARATUS FOR USE IN UNPACKING SHIPPING CONTAINERS, filed Mar. 26, 2018, each of which is incorporated by reference herein in its entirety.

FIELD

The present disclosure relates to an apparatus and especially, but not exclusively, to safety apparatus for use in unpacking shipping containers. The present disclosure extends to safety apparatus for use in packing shipping containers. The present disclosure further extends to related methods.

Definition

In the specification, the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

BACKGROUND

Shipping containers are widely used to transport cargo.

Often the cargo comprises goods in cartons, boxes or the like (often referred to herein as cartons, for conciseness) which are stacked one atop another in the shipping container. Stacking with substantially no extraneous material (such as pallets) between the cartons can provide efficiency in transportation, maximising the space within the container that is utilised for the cartons being transported. Many, and it is believed a majority of, shipping containers are in use packed with cartons that are 'loose stacked' (not palletized) requiring personnel to handle the cartons to unpack or pack the shipping containers, at distribution centres.

Unpacking of cartons packed in shipping containers often requires the cartons to be placed onto pallets for further transportation away from the location where the shipping container is unpacked.

This can be a time consuming and laborious task. As shipping containers are often 40 feet (about 12 metres) long, manually carrying each carton or box to a pallet located outside the shipping container is unduly laborious.

If cartons or packages are placed onto pallets inside the container, then the loaded pallets must then be removed from the container. This can be achieved by use of a manual pallet trolley which is a manually operable trolley provided with tines which can engage a pallet and allow carriage of the pallet by the pallet trolley. However, use of a manual pallet trolley is labour intensive and generally requires the pallet to be set down from the manual pallet trolley outside of, but close to, the shipping container so that it can be picked up by a forklift truck for transport away from the shipping container, for example, to a staging area for loading into a lorry or the like for further transportation. Further, if the loaded pallets are particularly heavy, it can be difficult, strenuous and/or a health hazard to move them using a manual pallet trolley.

A further option is to use powered plant, such as a forklift or the like (often referred to as powered material handling equipment, or MHE), to retrieve the loaded pallet from inside the shipping container. However, having powered material handling equipment and workers on foot sharing a working space creates a substantial safety hazard especially in the confined area of the inside of a shipping container, including a risk of ground personnel being crushed by material handling equipment. The safety hazard is sufficiently serious that safety guidelines dictate that powered material handling equipment and workers on foot should never be allowed inside a shipping container at the same time.

See, for example, the fifth bullet point on page 5 of SafeWork NSW's publication "GUIDE FOR UNPACKING SHIPPING CONTAINERS" ISBN 978 1 74341 383 8, available at http://www.safework.nsw.gov/au/_data/assets/pdf_file/ 0015/108060/guide-unpacking-shipping-containers-SW08344.pdf and archived under this URL on the Wayback Machine (http://archive.org).

Thus, if powered material handling equipment is to be used to retrieve pallets from inside a container, the container must be evacuated by workers on foot (often referred to herein as ground personnel) prior to entry of the powered material handling equipment. Such a procedure results in ground personnel spending a considerable amount of time waiting for operations of the powered material handling equipment, causing considerable delay and expense. Further, having ground personnel frequently exiting a shipping container at about the same time as powered material handling equipment is entering the shipping container may result in increased risk of accidents in mixed traffic areas immediately outside the shipping container.

A further attempt at efficiently unpacking shipping containers involves use of an articulated conveyor which extends into the shipping container so that cartons placed on the conveyor can be conveyed out of the container and placed on pallets outside the container. A conveyor of this type is sold under the trade mark Destuff-IT by Engineered Lifting Systems & Equipment Inc. of Elmira, Canada. However, such articulated conveyors are prohibitively expensive for many applications with a cost of many tens of thousands of dollars. Further, such conveyors require double-handling of each item, as each item must be placed onto the conveyor inside the shipping container and, then outside the shipping container, removed from the conveyor and placed on a pallet. Further, moving palletisation from inside the shipping container to outside the shipping container may result in increased interaction of ground personnel and powered material handling equipment immediately outside the container so that substantial accident risk may remain.

Other issues encountered in the unpacking of shipping containers include stacks of cartons toppling and injuring workers and strain injuries including those resulting from repeated lifting of cartons from a height above the shoulder height of a worker.

Similar issues apply to packing shipping containers, as powered material handling equipment may be used to move and deposit palletised cartons into a shipping container, where ground personnel then remove the cartons from the pallet and pack them, unpalletised.

The description of prior art or other background in this specification is not, and should not be taken as, an acknowledgment or any form of suggestion that the referenced prior art or other background forms part of the common general knowledge in Australia or in any other country.

SUMMARY

The present inventors have discerned apparatus and associated methods intended to overcome or mitigate at least some of the issues described above or at least to provide one or more useful alternatives for use in unpacking or packing shipping containers.

According to a first aspect of the present disclosure, there is provided an apparatus for use in unpacking or packing shipping containers comprising:

At least one barrier part which provides a barrier to wheeled powered material handling equipment, the barrier part being adapted to be positioned substantially transversely across an interior of a shipping container at a desired position along the length of the interior of the shipping container, and the apparatus being provided with an arrangement adapted, in use, to substantially maintain its location in the desired position against forces resulting from impact by powered material handling equipment operating within the shipping container.

Embodiments, in use, are adapted to provide a working area within the shipping container in which personnel may work on foot, and to provide a barrier which substantially impedes or prevents entry of wheeled powered material handling equipment into the working area.

In an embodiment, the apparatus comprises a moveable platform providing a platform surface, the moveable platform being dimensioned to provide a safety area of the platform surface, the safety area being spaced from the barrier part by at least the length of pallet engaging tines of powered material handling equipment adapted to operate inside a shipping container.

In an embodiment, the arrangement to substantially maintain the location of the apparatus in the desired position comprises at least one brake associated with a wheel of the apparatus.

In an embodiment, the apparatus comprises:
an elongate main body; and
a first-end region and a second-end region;
wherein the first-end and second-end regions are dimensioned and shaped to engage in recesses of respective first and second side walls of the shipping container.

In an embodiment, the arrangement to substantially maintain the location of the apparatus in the desired position comprises first-end and second-end regions and are dimensioned and shaped to engage in recesses of respective first and second side walls of the shipping container.

According to a second aspect of the present disclosure, there is provided an apparatus for unpacking or packing shipping containers comprising:

a moveable platform for use inside a shipping container, the moveable platform providing a platform surface, the moveable platform having at least one barrier part which provides a barrier to wheeled powered material handling equipment and the moveable platform being dimensioned to provide a safety area of the platform surface, the safety area being spaced from the barrier part by at least the length of pallet engaging tines of powered material handling equipment adapted to operate inside a shipping container.

In an embodiment, the barrier part is provided at or adjacent an edge of the platform.

In an embodiment, the barrier part is provided by a side of a structure that provides the platform.

In an embodiment, the barrier part is provided by a height of the platform being greater than a vertical step height that can be mounted by the powered material handling equipment.

In an embodiment, the apparatus is configured so that the platform provides a pallet retrieval area thereof adjacent the barrier which is accessible to the pallet engaging tines so that a pallet provided on the pallet retrieval area can be retrieved by said powered material handling equipment.

In an embodiment, the safety area is spaced from the barrier by at least one metre.

In an embodiment, the safety area has an area of at least one square metre.

In an embodiment, the platform has a width direction and has a length direction substantially perpendicular to the width direction.

In an embodiment, the apparatus is for use in a shipping container and is adapted to be used so that the width direction of the platform extends substantially in the width direction of the shipping container.

In an embodiment, the barrier extends substantially in the width direction of the platform.

In an embodiment, the platform has a width of at least 1.3 metres.

In an embodiment, the platform has a width of at least 1.5 metres.

In an embodiment, the platform has a width of at least 1.8 metres.

In an embodiment, the platform has a width of at least 2.0 metres.

In an embodiment, the platform has a width of at least 2.1 metres

In an embodiment, the platform has a width of less than 2.5 metres.

In an embodiment, the platform has a width of less than 2.4 metres.

In an embodiment, the platform has a width of less than 2.3 metres

In an embodiment, the platform is dimensioned to extend in a width direction thereof almost the entire width of the interior of a shipping container in which it is to be used.

In an embodiment, the apparatus is dimensioned to provide sufficient clearance from the opposed internal side walls of a shipping container in which it is to be used to allow the apparatus to be moved in the length direction of the shipping container whilst avoiding interference from the side walls of the shipping container.

In an embodiment, the platform has a width of at least two metres and of less than 2.4 metres. (Such an embodiment may be suitable for use in a shipping container with an internal width of about 2.4 metres.)

In an embodiment, the platform has a length of at least 1.3 metres.

In an embodiment, the platform has a length of at least 1.5 metres.

In an embodiment, the platform has a length of at least 1.8 metres.

In an embodiment, the platform has a length of at least 2.0 metres.

In an embodiment, the platform has a length of at least 2.1 metres

In an embodiment, the platform has a length of less than 3.0 metres.

In an embodiment, the platform has a length of less than 2.5 metres.

In an embodiment, the platform is substantially rectangular in shape.

In an embodiment, the platform is substantially square in shape.

In an embodiment, the apparatus comprises a plurality of wheel members.

In an embodiment, the apparatus comprises at least three wheel members each mutually spaced from each of the other two in a width direction of the apparatus.

In an embodiment, the apparatus comprises at least three wheel members each mutually spaced from each of the other two in a length direction of the apparatus.

In an embodiment, the wheel members allow the platform to be moved manually.

In an embodiment, the wheel members have respective axes of rotation, the axes extending in the width direction of the apparatus.

In an embodiment, the wheel members are arranged to support the apparatus relative to a support surface.

In an embodiment, the apparatus comprises at least one brake.

In an embodiment, the brake is operable to contact at least one wheel member to prevent or restrict rotation of said at least one wheel member.

In an embodiment, the apparatus comprises a chassis to which a plurality of wheel members are mounted.

In an embodiment, the chassis comprises a plurality of laterally extending spaced apart structural members and a plurality of further structural members arranged substantially perpendicular to the laterally extending spaced apart structural members.

In an embodiment, the apparatus comprises at least one shoring support member which projects upwardly above a height of the platform to facilitate shoring of cargo adjacent the apparatus.

In an embodiment, the apparatus comprises at least two shoring support members.

In an embodiment, the, or each shoring support member projects substantially vertically upwards above the height of the platform.

In an embodiment, the, or each shoring support member is configured to at least partially support a shoring bar for shoring of cargo adjacent the apparatus.

In an embodiment, the, or each shoring support member provides at least one shoring bar attachment structure for facilitating attachment of a shoring bar to said shoring support member.

In an embodiment, the, or each shoring support member provides a plurality of shoring bar attachment structures for facilitating attachment of a shoring bar to said shoring support member.

In an embodiment, the shoring bar attachment structures of said plurality of shoring bar attachment structures are substantially vertically spaced apart.

In an embodiment, the, or each shoring bar attachment structure defines an aperture for receiving an end of a shoring bar.

In an embodiment, the apparatus provides first and second shoring support members arranged to support a shoring bar therebetween.

In an embodiment, the, or each shoring support member is provided at or adjacent a rear edge of the platform.

In an embodiment, the, or each, shoring support member is provided at or adjacent a corner of the platform.

In an embodiment, the apparatus comprises at least one post which projects upwardly from the platform.

In an embodiment the platform has a front and a rear.

In an embodiment, the apparatus comprises at least one rear post provided towards the rear of the platform.

In an embodiment, the apparatus comprises at least two rear posts provided towards the rear of the platform.

In an embodiment, the apparatus comprises at least one front post provided towards the front of the platform.

In an embodiment, the apparatus comprises at least two front posts provided towards the front of the platform.

In an embodiment, the apparatus comprises at least one intermediate post provided between a rear post and the front of the platform.

In an embodiment, the apparatus comprises a pallet turntable.

In an embodiment the pallet turntable is provided on the platform.

In an embodiment the pallet turntable is electrically operated.

In an embodiment the apparatus comprises a power supply for supplying electrical power to the pallet turntable.

In an embodiment the power supply comprises a battery.

In an embodiment the apparatus comprises at least one roll guide for guiding movement of a roll of stretch film.

In an embodiment the roll guide comprises a substantially vertical elongate member.

In an embodiment the roll guide is supported by at least one post of the apparatus.

In an embodiment the apparatus comprises at least one roll storage arrangement for storing a roll of stretch film.

In an embodiment the roll storage arrangement comprises a substantially vertical elongate member adapted to be received in a central cylindrical cavity of a roll of stretch film.

In an embodiment the roll storage arrangement is supported by at least one post of the apparatus.

In an embodiment the apparatus comprises at least one fan.

In an embodiment the fan is mounted above the platform.

In an embodiment the fan is supported by at least one post of the apparatus.

In an embodiment the apparatus comprises at least one light.

In an embodiment the light is mounted above the platform.

In an embodiment the light is supported by at least one post of the apparatus.

In an embodiment the apparatus comprises at least one drink holder for a drink receptacle.

In an embodiment the drink holder is mounted above the platform.

In an embodiment the drink holder is supported by at least one post of the apparatus.

In an embodiment the apparatus comprises at least one tablet holder for a tablet used for data entry.

In an embodiment the tablet holder is mounted above the platform.

In an embodiment the tablet holder is supported by at least one post of the apparatus.

In an embodiment the apparatus comprises at least one step which is moveable between a substantially vertical storage position and a substantially horizontal operating position.

In an embodiment the step is mounted above the platform.

In an embodiment the step is supported by at least one post of the apparatus.

In an embodiment the step is supported by at least two posts of the apparatus

According to a third aspect of the present disclosure, there is provided a method of packing or unpacking a shipping container comprising:

operating a powered material handling equipment to move pallets into or out of the shipping container through an opening of the shipping container;

providing a barrier within the shipping container, the barrier being configured to allow one or more pallet engaging parts of a powered material handling equipment to pass the barrier but to substantially impede the passage of a wheeled part of the powered material handling equipment;

providing a working area on a side of the barrier distal from the opening of the shipping container, the working area including a safety area which is spaced apart from the barrier by a distance greater than the length of the one or more pallet engaging tines of the powered material handling equipment;

providing at least one pallet close to the barrier and within reach of a worker located in the working area;

manually loading or unloading the at least one pallet with material to be unpacked from, or packed into, the shipping container; and moving at least one pallet between the opening of the shipping container and the working area using the powered material handling equipment, while one or more personnel remain within the shipping container in the working area.

In an embodiment, providing at least one pallet close to the barrier and within reach of a worker located in the working area comprises providing one or more pallets at a part of the working area which is closer to the barrier than is the safety area.

In an embodiment, the method comprises providing a platform which is elevated above the level of a floor of the shipping container.

In an embodiment, the platform is elevated between 100 mm and 400 mm above the level of the floor of the shipping container.

In an embodiment, the platform is elevated approximately 200 mm above the level of the floor of the shipping container.

In an embodiment, at least part of the working areas comprises at least part of a surface of the platform.

In an embodiment, the barrier comprises a step defined by a difference in height between the platform and the floor of the shipping container.

In an embodiment, the platform is moveable in the length direction of the shipping container.

In an embodiment, the platform is provided with wheels to facilitate movement thereof.

In an embodiment, the platform is provided with a brake to impede or prevent movement of the platform in the length direction of the shipping container.

In an embodiment, the method comprises use of an apparatus in accordance with the second aspect.

According to a fourth aspect of the present disclosure, there is provided an apparatus for use in a shipping container during packing or unpacking of the shipping container to provide a barrier between an area within a shipping container in which powered material handling equipment is permitted to operate, this area being relatively unsafe for personnel on foot, and an area within the shipping container in which powered material handling equipment is physically restrained from operating thereby providing a relatively safe working area, within the shipping container, in which personnel may be relatively safely accommodated even when powered material handling equipment is operating within the shipping container, the apparatus providing a barrier apparatus comprising:

an elongate main body; and a first-end region and a second-end region;

wherein the first-end and second-end regions are dimensioned and shaped to engage in recesses of respective first and second side walls of the shipping container.

In an embodiment, the first-end and second-end regions are dimensioned and shaped to engage in recesses provided by corrugation of the respective first and second side walls of the shipping container.

In an embodiment, at least one of the first- and second-end regions comprises a terminal region oriented substantially perpendicular to the direction of elongation of the barrier apparatus.

In an embodiment, the terminal region provides an end face of the barrier apparatus.

In an embodiment, the end face is oriented substantially perpendicular to the direction of elongation of the barrier apparatus.

In an embodiment, the terminal region has a width smaller than the transverse width of the main body.

In an embodiment, the terminal region has a width not substantially greater than the width of a planar region, of a shipping container side wall, which defines the most set back part of a recess in the side wall.

In an embodiment, the terminal region has a width not substantially greater than 70 mm.

In an embodiment, the terminal region has a width not substantially greater than 60 mm In an embodiment, at least one of the first- and second-end regions comprises at least one tapered region widening between the terminal region and a part of the main body.

In an embodiment, at least one tapered region has a taper angle such that it diverges away from a tapered wall part of the recess as it extends in the outwards direction of the recess.

In an embodiment, at least one tapered region is arranged at an angle no greater than 70 degrees from a length direction of the barrier apparatus.

In an embodiment, at least one tapered region is arranged at an angle no greater than 62 degrees from a length direction of the barrier apparatus.

In an embodiment, at least one tapered region is arranged at an angle no less than 35 degrees from a length direction of the main body.

In an embodiment, the apparatus is provided with at least one handle part.

In an embodiment, the apparatus is provided with at least two handle parts.

In an embodiment, at least two handle parts are each spaced apart from respective end regions.

In an embodiment, at least two handle parts are each spaced apart from respective end regions by at least one sixth of the length of the barrier apparatus.

In an embodiment, at least two handle parts are each spaced apart from respective end regions by at least one quarter of the length of the barrier apparatus.

In an embodiment, at least two handle parts are each spaced apart from respective end regions by approximately one quarter of the length of the barrier apparatus.

In an embodiment, at least one handle part is provided on or at an in-use upper part of the barrier apparatus.

In an embodiment, at least one handle part is provided so that it does not project substantially outwardly or upwardly from the in-use upper part of the barrier apparatus.

In an embodiment, at least one handle part is provided on or at an in-use upper part of the main body.

In an embodiment, at least one handle part is provided so that it does not project substantially outwardly or upwardly from the in-use upper part of the main body.

In an embodiment, at least one handle part is provided at end region.

In an embodiment, first and second end region handles are provides at respective first and second end regions.

In an embodiment, the barrier apparatus is made substantially from metal.

In an embodiment, the barrier apparatus is made substantially from aluminium.

In an embodiment, the main body comprises a metal section.

In an embodiment, the main body comprises a metal C-section.

In an embodiment, the main body comprises a main body part made substantially from a metal section.

In an embodiment, the main body comprises a main body part made substantially from a metal C-section.

In an embodiment, the apparatus is provided with at least one foot part.

In an embodiment, the apparatus is provided with at least two foot parts.

In an embodiment, at least two foot parts are each spaced apart from respective end regions.

In an embodiment, at least two foot parts are each spaced apart from respective end regions by at least one sixth of the length of the barrier apparatus.

In an embodiment, at least two foot parts are each spaced apart from respective end regions by at least one quarter of the length of the barrier apparatus.

In an embodiment, at least two foot parts are each spaced apart from respective end regions by approximately one quarter of the length of the barrier apparatus.

In an embodiment, at least one foot part is made from the same type of metal section as used in the main body part.

In an embodiment, at least one foot part is welded to the main body part.

In an embodiment, the barrier apparatus has a height of at least 100 mm.

In an embodiment, the barrier apparatus has a height of at least 120 mm.

In an embodiment, the barrier apparatus has a width equal to at least half the height of the barrier apparatus.

In an embodiment, the barrier apparatus has a width equal to at least half the height of the barrier apparatus.

In an embodiment, the barrier apparatus has a width between about half and about two times the height of the barrier apparatus.

In an embodiment, the main body provides at least one blocking region adapted to substantially impede or prevent passage of a powered material handling equipment, of a type expected to be used in a shipping container, across the barrier apparatus, and at least one axially extending region adapted to allow passage of a person, on foot, across the barrier apparatus, said axially extending region being shaped and/or dimensioned to provide a substantially reduced tripping hazard compared to the tripping hazard presented by the blocking region.

In an embodiment, the main body provides at least one region of greater height and at least one axially extending region of lesser height.

In an embodiment, at least one said region of greater height has a height of at least 100 mm.

In an embodiment, at least one said region of greater height has a height of at least 100 mm.

In an embodiment, at least one said region of greater height has a height sufficient to substantially impede or prevent passage of a powered material handling equipment, of a type expected to be used in a shipping container, thereacross.

In an embodiment, at least one axially extending region of lesser height has a height of less than 30 mm.

In an embodiment, at least one axially extending region of lesser height has a height of less than 20 mm.

In an embodiment, at least one axially extending region of lesser height has a height of less than 15 mm.

In an embodiment, at least one axially extending region of lesser height has a height of less than 12 mm.

In an embodiment, at least one axially extending region of lesser height is sufficiently small in height to provide a substantially reduced tripping hazard to a person crossing the barrier apparatus on foot, by crossing at the axially extending region of lesser height, compared to said person crossing the apparatus on foot by crossing at a region of greater height.

In an embodiment, at least one axially extending region of lesser height is provided adjacent an end region of the barrier apparatus.

In an embodiment, an axially extending region of lesser height is provided adjacent each end region of the barrier apparatus.

In an embodiment, at least one axially extending region of lesser height comprises an axially extending base plate portion.

In an embodiment, the apparatus comprises an axially extending base plate portion which underlies a main body part which forms at least one said region of greater height.

In an embodiment, the apparatus comprises one or more foot part provided between, and spacing apart, said axially extending base plate portion and said main body part which forms at least one said region of greater height.

In an embodiment, the barrier apparatus is adapted to provide a length thereof, extending in use in the transverse direction of a shipping container, of between 2352 mm and 2424 mm.

In an embodiment, the barrier apparatus is adapted to provide a length thereof, extending in use in the transverse direction of a shipping container, of between 2388 mm and 2424 mm.

In an embodiment, the barrier apparatus is adapted to provide a length thereof, extending in use in the transverse direction of a shipping container, of between 2398 mm and 2414 mm.

In an embodiment, the barrier apparatus is adapted to provide a length thereof, extending in use in the transverse direction of a shipping container, of between 2311 mm and 2383 mm.

In an embodiment, the barrier apparatus is adapted to provide a length thereof, extending in use in the transverse direction of a shipping container, of between 2347 mm and 2383 mm.

In an embodiment, the barrier apparatus is adapted to provide a length thereof, extending in use in the transverse direction of a shipping container, of between 2357 mm and 2373 mm.

In an embodiment, the barrier apparatus is of fixed length.

In an embodiment, the barrier apparatus has a length of between 2352 mm and 2424 mm.

In an embodiment, the barrier apparatus has a length of between 2388 mm and 2424 mm.

In an embodiment, the barrier apparatus has a length of between 2398 mm and 2414 mm.

In an embodiment, the barrier apparatus has a length of between 2311 mm and 2383 mm.

In an embodiment, the barrier apparatus has a length of between 2347 mm and 2383 mm.

In an embodiment, the barrier apparatus has a length of between 2357 mm and 2373 mm.

In an embodiment, the barrier apparatus has a mass of less than 25 kg.

In an embodiment, the barrier apparatus has a mass of less than 20 kg.

In an embodiment, the barrier apparatus has a mass of less than 15 kg.

In an embodiment, the barrier apparatus has a mass of less than 10 kg.

According to a fifth aspect of the present disclosure, there is provided a method of manufacturing a barrier apparatus for use in a shipping container, the method comprising:

assessing at least some of the dimensions of a shipping container of a type with which the barrier apparatus is intended for use, including considering the distance between first-side and second-side corrugated side wall portions of the shipping container;

determining a suitable length of elongation for the barrier apparatus, such that when arranged substantially transversely across the shipping container and substantially parallel with a floor of the shipping container, with a first-end part of the barrier apparatus located within a recess provided in and by the first-side corrugated side wall, a second-end part of the barrier apparatus will be located in a recess provided in and by the first-side corrugated side wall; and manufacturing the barrier apparatus to have a length substantially corresponding to the determined suitable length.

In an embodiment, assessing the dimensions of a shipping container of a type with which the barrier apparatus is intended for use comprises reference to information relating to the dimensions of one or more shipping containers which have substantially the same relevant dimensions as a shipping container with which the barrier apparatus is intended for use.

Thus, 'assessing the dimensions of a shipping container of a type with which the barrier apparatus is intended for use' should not be taken as requiring that any individual shipping container is physically assessed.

In an embodiment, the method comprises determining at least two suitable lengths, and manufacturing the apparatus to have a length falling within a range the bounds of which correspond substantially to the minimum and maximum determined suitable lengths.

In an embodiment, the method comprises determining a range of suitable lengths, and manufacturing the apparatus to have a length falling within the determined range.

In an embodiment, assessing at least some of the dimensions of the shipping container of a type with which the barrier apparatus is intended for use, includes assessing an internal width of the shipping container between more laterally inwards wall portions of the respective side walls, and assessing an internal width of the shipping container between more laterally outwards wall portions of the respective side walls.

In an embodiment, determining a suitable length, L, of elongation for the barrier apparatus comprises determining one or more lengths within the range:

$$WI < L < WMI,$$

where, WI is the internal width of the shipping container between more laterally inwards wall portions of the respective side walls, and WMI is the internal width of the shipping container between more laterally outwards wall portions of the respective side walls.

In an embodiment, determining a suitable length, L, of elongation for the barrier apparatus comprises determining one or more lengths within the range:

$$WI+20 \text{ mm} < L < WMI,$$

where, WI is the internal width of the shipping container between more laterally inwards wall portions of the respective side walls, WMI is the internal width of the shipping container between more laterally outwards wall portions of the respective side walls, and 20 mm means 20 millimetres.

In an embodiment, determining a suitable length, L, of elongation for the barrier apparatus comprises determining one or more lengths within the range:

$$WI+((WI-WMI)/2) < L < WMI,$$

where, WI is the internal width of the shipping container between more laterally inwards wall portions of the respective side walls, and WMI is the internal width of the shipping container between more laterally outwards wall portions of the respective side walls.

In an embodiment, determining a suitable length, L, of elongation for the barrier apparatus comprises determining one or more lengths within the range:

$$WI+((WI-WMI)/2)+10 \text{ mm} < L < WMI-10 \text{ mm},$$

where, WI is the internal width of the shipping container between more laterally inwards wall portions of the respective side walls, and WMI is the internal width of the shipping container between more laterally outwards wall portions of the respective side walls, and 10 mm means 10 millimetres.

In an embodiment, assessing at least some of the dimensions of the shipping container of a type with which the barrier apparatus is intended for use, includes determining a depth of recesses provided by the corrugations in the side walls.

It will be appreciated that in a shipping container in which opposed side walls provide corrugations of similar form and dimensions, the recess depth may be regarded as ((WI−WMI)/2), so that the expressions above which include the term ((WI−WMI)/2) may be expressed in terms of WI and the recess depth DR, as WI+DR<L<WI+2DR (or WI+DR+10 mm<L<WI+2DR−10 mm) and in terms of WMI and the recess depth, DR, as WMI−DR<L<WMI (or DR, as WMI−DR+10 mm<L<WMI−10 mm).

In an embodiment, determining a suitable length, L, of elongation for the barrier apparatus comprises determining one or more lengths within the range.

In an embodiment, the method comprises manufacturing the barrier apparatus to have a substantially fixed length.

It should be appreciated that the method according to the fifth aspect is particularly intended to be applied to manufacturing a barrier apparatus in accordance with at least one of the first and fourth aspects.

According to a sixth aspect of the present disclosure, there is provided a barrier apparatus for use in a shipping container, wherein the barrier apparatus has been manufactured according to the method of the fifth aspect.

According to a seventh aspect of the present disclosure, there is provided a method for use in at least one of packing and unpacking a shipping container, comprising:

positioning a barrier within the shipping container to provide:

a first area within the shipping container in which powered material handling equipment is permitted to operate, this area being relatively unsafe for personnel on foot; and a second area within the shipping container into which powered material handling equipment is physically restrained from entering, thereby providing a relatively safe working area, within the shipping container, in which personnel may be relatively safely accommodated even when powered material handling equipment is operating within the shipping container; and wherein at least one worker is accommodated in the second area during a period during which powered material handling equipment operates in the first area.

In an embodiment, the method comprises at least one worker on foot manually moving material between a pallet and a stack of packed material within the shipping container.

In an embodiment, the method comprises at least one worker on foot manually moving material from a pallet to a stack of packed material within the shipping container, during packing of the shipping container.

In an embodiment, the method comprises at least one worker on foot manually moving material to a pallet from a stack of packed material within the shipping container, during unpacking of the shipping container.

In an embodiment, the method comprises wrapping the material stacked on the pallet with plastic wrap, within the shipping container.

In an embodiment, the powered material handling equipment is a forklift.

In an embodiment, the method comprises using the powered material handling equipment to place at least one pallet in the working area by passing tines of the powered material handling equipment bearing the pallet at least partly over the barrier.

In an embodiment, the method comprises using the powered material handling equipment to remove at least one pallet from the working area by passing tines of the powered material handling equipment at least partly over the barrier to engage the pallet.

In an embodiment, the method comprises using the powered material handling equipment to move a line of loaded pallets towards the barrier by pushing a pallet, of the line of pallets, towards the barrier so that the said pallet pushes at least one other pallet in the line of pallets towards the barrier.

In an embodiment, the method comprises use of apparatus in accordance with the at least one of the first second fourth and sixth aspects to provide the barrier.

In an embodiment, the method comprises providing a support in the working area to support a pallet so that the pallet is spaced sufficiently from a floor of the shipping container so that the pallet can be operatively engaged by tines of powered material handling equipment when the tines are at a height sufficient to pass at least partly over the barrier.

In an embodiment, positioning the barrier comprises positioning the barrier substantially transversely across an interior of the shipping container at a desired position along the length of the interior of the shipping container.

In an embodiment, the apparatus is provided with an arrangement to substantially maintain its location in the desired position against forces resulting from impact by powered material handling equipment.

In an embodiment, the apparatus comprises first and second end regions and positioning the barrier comprises locating the first and second end regions in recesses provided in respective first and second side walls of the shipping container.

In an embodiment, the apparatus comprises first and second end regions and positioning the barrier comprises locating the first and second end regions in recesses provided by corrugations in respective first and second side walls of the shipping container.

In an embodiment, the apparatus comprises first and second end regions and positioning the barrier comprises locating the first and second end regions in substantially directly opposed recesses provided in respective first and second side walls of the shipping container.

It will be appreciated, that features or characteristics described in relation to any of the above aspects or embodiments thereof may, unless logic or common sense dictates otherwise, be incorporated mutatis mutandis into any of the other aspects.

BRIEF DESCRIPTION OF THE DRAWINGS

Embodiments will be described below, in detail, with reference to accompanying drawings. The primary purpose of this detailed description is to instruct persons having an interest in the subject matter of the invention how to carry the invention into practical effect. However, it is to be clearly understood that the specific nature of the following detailed description does not supersede the generality of the preceding broad description in the Summary, above. In the accompanying diagrammatic drawings:

FIGS. 15(a) to 15(g) show schematically, by way of example, variations of the configuration of the end region shown in FIG. 10;

DETAILED DESCRIPTION OF THE EMBODIMENTS

Figure 1:
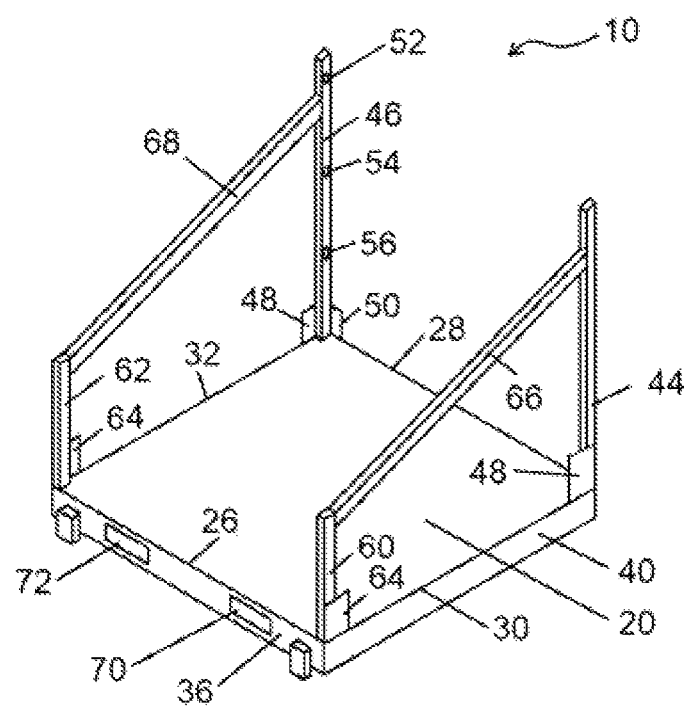
FIG. 1 is a schematic perspective view of an embodiment of an apparatus for packing and unpacking shipping containers in accordance with the present disclosure.

With reference to the FIGS. 1 to 5, a first embodiment of an apparatus in accordance with the present disclosure comprises a barrier integrated into a moveable platform, providing a safety apparatus, generally designated 10, for use within a shipping container.

The safety apparatus 10 provides a working platform 20, having a front region 22 which, in use, is provided closer to an opening of the shipping container and a rear region 24, which, in use, is provided further from the opening of the shipping container and adjacent material packed in the shipping container, such as, for example, material to be unpacked from the shipping container.

In this embodiment, the working platform 20 is substantially square having a front edge 26, a rear edge 28 and first and second side edges 30, 32.

In this embodiment, the working platform 20 is provided by a robust metal surface formed from one or more metal plates.

The safety apparatus 10 provides a front skirt part 36 depending downwardly from the front edge 26, a rear skirt part 38 depending downwardly from the rear edge 28 and first and second side skirt parts 40, 42 depending downwardly from the respective first and second side edges 30, 32. The front skirt part 36 and/or front edge of the platform may be regarded as providing a barrier to MHEs.

The platform and skirts may conveniently be formed of aluminium tread plate (sometimes called checker plate) of about 3 mm thickness.

The apparatus 10 is for use in a shipping container and is intended to extend across substantially the entire width of the shipping container, while allowing adequate clearance between the sides of the apparatus and the interior side walls of the shipping container to allow ease of movement of the apparatus along the length of the shipping container. In an embodiment, the width of the platform 20 is about 2200 mm. An embodiment therefore provides a substantially square platform 20, about 2200 mm on each side.

The working platform 20 and skirt parts 36, 38, 40, 42 are attached to, and supported by, a wheeled substructure 400, shown in FIG. 4, which will be described in more detail in due course.

The safety apparatus 10 further provides first and second rear posts 44, 46 located at the rear corners of the working platform 20. Each of the rear posts 44, 46 is supported by a first bracing plate 48 which extends a short distance along a side edge 30, 32 of the working platform 20 and a second bracing plate 50 which extends a short distance along the rear edge 28 of the working platform 20.

Figure 2:
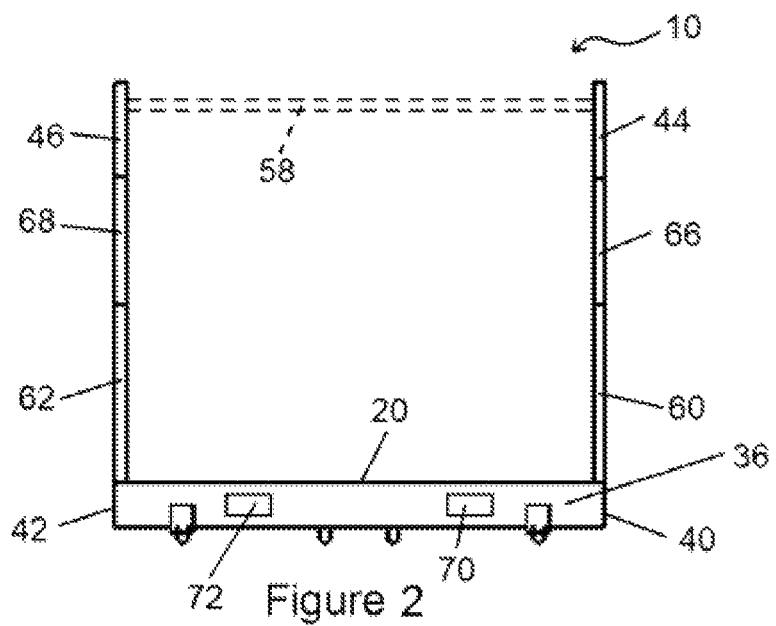
FIG. 2 is a front view of the apparatus of FIG. 1.
Figure 3:
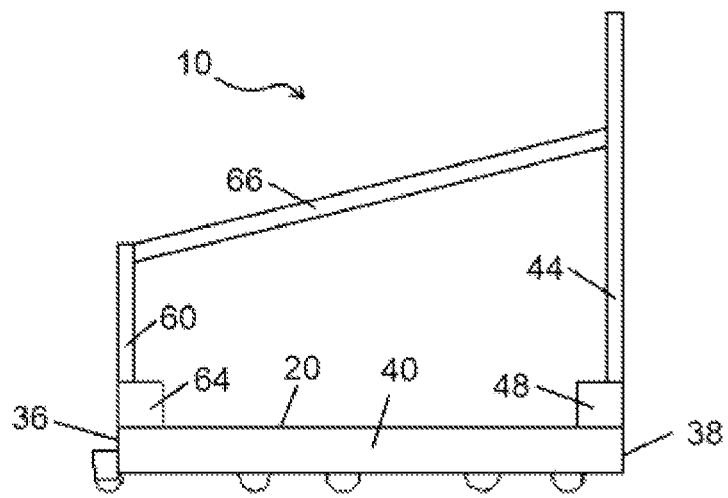
FIG. 3 is a schematic side view of the apparatus of FIG. 1.

The first and second rear posts 44, 46 are each provided with a plurality of vertically spaced attachment points, e.g. 52, 54, 56, for allowing attachment of a shoring bar 58, an example of which is shown in broken lines in FIG. 2. The shoring bar 58 can be positioned extending horizontally between the first and second rear posts 44, 46 to provide support to a stack of material (such as cartons) in the shipping container to prevent toppling and thereby protect workers from falling material.

Shoring bars are known per se in the field of cargo transportation and a known type of shoring bar is adjustable in length and has first and second ends which, in use, fit into respective first and second opposed apertures. The apertures may be provided in track members. One commercially available type of track is sometimes referred to as 'Series F Logistic Track' and this type of track may provide circular apertures of approximately 0.75 inch to 1.0 inch (approximately 19 mm to 25 mm) diameter, spaced apart by a distance approximately equal to the aperture diameter. Shoring bars with ends which fit into the apertures of Series F Logistic Track are commercially available. The attachment points 52, 54, 56 may conveniently be in the form of apertures corresponding in form (and, if desired, spacing) to the apertures of commercially known shoring bar track thus allowing commercially available shoring bars to be used. It will be appreciated that although three attachment points 52, 54, 56 are illustrated as being on each of the first and second rear posts 44, 46, any desired and practicable number of attachment points may be provided, as desired. In the illustrated embodiment, the apertures which provide the attachment points, e.g. 52, 54, 56, are formed in the box sections that form the rear posts 44, 46 but, if desired, additional components (for example, commercially available 'tracks') with suitable shoring bar attachment arrangements, could be attached to the rear posts 44, 46.

The safety apparatus 10 further provides first and second front posts 60, 62 located at the front corners of the working platform 20. Each of the front posts 60, 62 is supported by a bracing plate 64 which extends a short distance along a side edge 30, 32 of the working platform 20. In this embodiment, the front posts 60, 62 are substantially shorter than the rear posts 44, 46.

The safety apparatus 10 further provides first and second inclined side rails 66, 68. Each side rail 66, 68 extends from the top of a respective front post 60, 62 upwardly to an upper part of the respective rear post 44, 46, at or adjacent the top thereof. The side rails 66, 68 may act as hand rails in use, may help prevent personnel from accidentally stepping or slipping off the sides of the platform and also help reinforce the rear posts 44, 46 and thereby help prevent them from flexing when under load, for example, when they are under load because the shoring bar is supporting stock that would otherwise topple.

In an embodiment, the rear posts 44, 46 are approximately 2000 mm tall and the front posts 60, 62 are approximately 1000 mm tall.

The posts 44, 46, 60, 62 and inclined side rails 66, 68 may conveniently be formed of aluminium 50 mm by 50 mm box sections. The bracing plates may be aluminium plates approximately 160 mm wide by 160 mm long and 10 mm thick.

Figure 4:
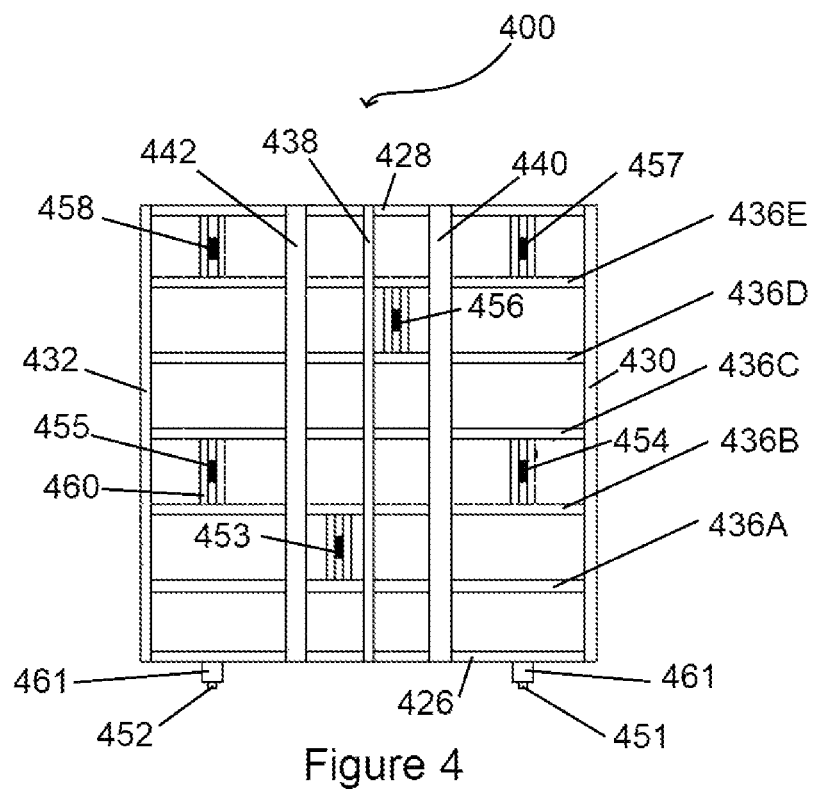
FIG. 4 is a schematic top view of an internal frame of the apparatus of FIG. 1 and some associated components.
Figure 4A:
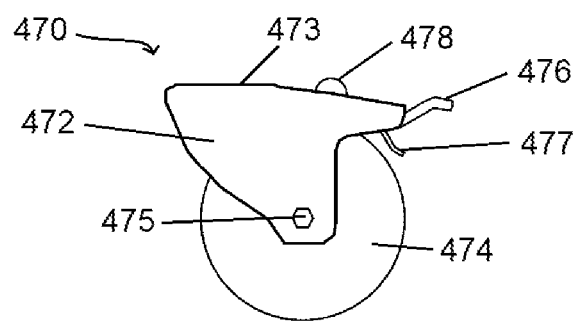
FIG. 4(a) is a schematic illustration of a castor including a brake.

As foreshadowed above, the working platform 20 and skirt parts 36, 38, 40, 42, and also the front and rear posts 60, 62, 44, 46 are attached to, and supported by, a wheeled substructure 400, an example embodiment of which is illustrated in FIG. 4, which allows the apparatus 10 to be moved into a desired position within a shipping container.

The wheeled substructure 400 comprises front and rear members 426, 428 which extend in a transverse direction of the apparatus and which substantially underlie the respective front and rear edges 26, 28 of the working platform 20. The wheeled substructure 400 further comprises first and second side members 430, 432 which connect respective ends of the front and rear members 426, 428 and which substantially underlie the respective side edges 30, 32 of the working platform 20. The first and second side members 430, 432 thus extend in the front-to-rear direction of the apparatus 10.

In this embodiment, the front and rear members 426, 428 and side members 430, 432 form a substantially square frame of the wheeled substructure 400 and the wheeled substructure 400 further comprises first to fifth further transversely extending members 436A, 436B, 436C, 436D, 436E, each of which extends between the respective comprises first and second side members 430, 432 substantially parallel to the front and rear members 426, 428. The front and rear members 426, 428 and the first to fifth further transversely extending members 436A, 436B, 436C, 436D, 436E are substantially evenly spaced apart in the front-to-rear direction of the apparatus 10.

In this embodiment, the wheeled substructure 400 further comprises a substantially transversely central strengthening member 438 and first and second tine channel members 440, 442 adapted to receive the tines or fork parts of a forklift. The strengthening member 438 and first and second tine channel members 440, 442 extend in the front-to-rear direction of the apparatus substantially parallel to the first and second side members 430, 432. The spacing between the first and second tine channel members 440, 442 is appropriate to allow the two tines of a standard forklift to be received in the respective tine channel members 440, 442. As can be seen in FIGS. 1 and 2, openings 70, 72 are provided in the front skirt part 36 to allow the tines to enter the tine channel members 440, 442.

The members front and rear members 426, 428, side members 430, 432 and further transversely extending members 436A, 436B, 436C, 436D, 436E may conveniently be 50 mm by 50 mm box sections with a wall thickness of 3 mm. The tine channel members 440, 442 may conveniently be formed by aluminium box section members 100 mm wide by 50 mm high with a wall thickness of 3 mm. The various members may be connected by welding at their intersections and the rest of the apparatus 10 may also be welded together or, (if desired), assembled by any other appropriate method, such as use of bolts or the like.

The wheeled substructure 400 further comprises a number of wheels. In the illustrated embodiment, the wheeled substructure 400 comprises eight wheels but, of course, fewer or more wheels may be provides as desired and appropriate.

In the illustrated embodiment, the wheeled substructure 400 provides first and second front wheels 451, 452 which are provided with foot-operated brakes. The wheeled substructure 400 further provides first and second substantially transversely central wheels 453, 456, the first of which is mounted between the first and second further transversely extending members 436A, 436B and the second of which is mounted between the fourth and fifth further transversely extending members 436D, 436E. The wheeled substructure 400 further provides a more forward pair of transversely more outward wheels 454, 456 mounted between the second and third further transversely extending members 436B, 436C and a more rearward pair of transversely more outward wheels 457, 458 mounted between the fifth further transversely extending member 436E and the rear member 428.

The illustrated embodiment provides wheels which have bearings and which have a load rating of at least 200 to 300 kg per wheel. In a particular embodiment, wheel assemblies with cast iron or steel bodies and a rubber or polymer (e.g. nylon) ground engaging surface are used.

The wheels may be connected to the members forming the wheeled substructure 400 in any desired manner and, in an embodiment, are supported relative to the members described above by lengths of right section angle aluminium, e.g. 460, for example, with a wall thickness of about 6 mm.

The front wheels 451, 452 which extend beyond the perimeter of the platform 20 may be mounted on aluminium mounting plates or brackets (for example, with a plate thickness of about 10 mm) and may be protected from impacts (for example, by a forklift) by welded aluminium plates or shrouds 461. These front wheels 451, 452 may be in the form of castors to facilitate manoeuvring of the apparatus.

It will be appreciated that suitable wheels and wheel assemblies, including castor wheel assemblies with foot operated brakes, are commercially available. By way of example, FIG. 4(*a*) illustrates schematically a castor wheel assembly 470 of a type that is known per se and commercially available. The castor wheel assembly 470 comprises a wheel housing 472, having an upper region 473 suitable for attachment to a swivel plate (not shown). A wheel 474 is attached to the wheel housing 472 by a bolt 475, which provides an axis for the wheel. The wheel assembly 470 provides a foot-operable brake lever 476 for locking a brake member 477 in engagement with the wheel 474. The wheel assembly 470 further comprises a foot-operable release part 478 (attached to, and moveable with, the brake lever 475) for disengaging the brake from the wheel 474.

The height of the platform above a surface on which the apparatus is supported (in use, typically the floor of the shipping container) is about 200 mm. This height is sufficient to ensure that a typical forklift, or other powered material handling equipment (MHE) cannot be driven up onto the platform. The front of the apparatus therefore provides a barrier which is substantially impassable by the forklift or other powered MHE. However, it will be appreciated that it is not absolutely necessary that the barrier be substantially impassable by the MHE: it may be considered sufficient to provide a barrier that cannot be inadvertently or accidentally passed, since a properly trained operator of the powered MHE will be aware of the presence and function of the apparatus 10 and will trying to avoid hazardous actions.

Thus some practical embodiments may have a platform height less than 200 mm, for example 150 mm or even slightly less.

An example of use of the apparatus 10 will now be described with reference to FIG. 5.

As foreshadowed above, the apparatus 10 is for use in a shipping container 500. The apparatus 10 and, in particular, the platform 20 extends across substantially the entire width of the shipping container 500 while allowing adequate clearance between the sides of the apparatus and the interior side walls of the shipping container 500 to allow ease of movement of the apparatus along the length of the shipping container. As illustrated in FIG. 5, the shipping container has an open end 502 and a closed end 504.

The height of the platform 20 above a surface on which the apparatus is supported (in use, typically the floor of the shipping container 500) is about 200 mm. This height is sufficient to ensure that a typical forklift 505 or other powered material handling equipment (MHE) cannot be driven up onto the platform 20. The front of the apparatus 10 therefore provides a barrier which is substantially impassable (or at least which cannot be inadvertently passed) by the forklift or other powered MHE. If it is desired to provide a barrier which is substantially impassable, then greater heights may be required in order to provide a substantially impassable barrier to particular types of powered MHE. It will be appreciated that desired platform height can be achieved during manufacture by providing suitable robust spacers between the subframe 400 and the platform. Of course, in selecting the platform height overhead clearance should be considered taking into account the internal heights of shipping containers within which the apparatus is to be used. Typical internal heights for shipping containers are between about 2.4 and 2.7 metres, so a platform height of about 200 mm may be regarded as providing both a practicable platform height and ample overhead clearance for personnel standing on the platform in a typical shipping container.

The forklift 505 has tines which, in use, are engaged in tine receiving openings of a pallet 507 to enable the pallet to be transported by the forklift 505.

Figure 5:
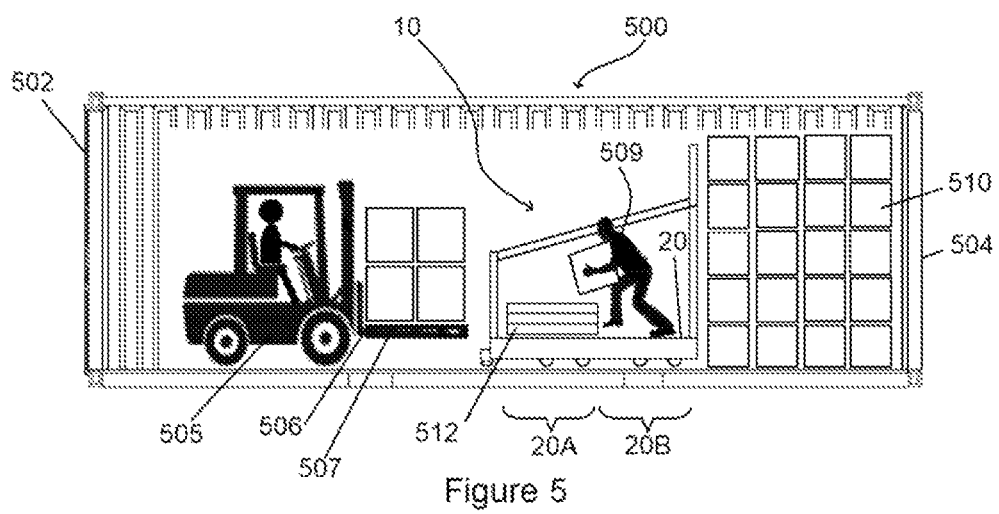
FIG. 5 is a schematic illustration of the apparatus of FIG. 1 in use.

As illustrated in FIG. 5, a worker, or ground personnel 509, is standing on the platform 20 of the apparatus 10 and manually moving cartons from the stacks of cartons 510 onto pallets 512. It will be appreciated that, as illustrated in FIG. 5, the shipping container 500 has been partially unpacked so that only about a quarter of its length is filled with cartons 510 at the stage shown. Further, it will be appreciated that the apparatus 10 is moved along the length of the shipping container 500 as the shipping container 500 is unpacked so that the apparatus is, in use, close to the accessible cargo, e.g. cartons 510, that is yet to be unpacked.

The pallets 512 onto which the ground personnel 509 is placing the cartons are placed on the platform 20 towards the front of the apparatus. When a pallet 512 is adequately filled with cartons the ground personnel may wrap the cartons stacked on the pallet with plastic wrap (an operation known per se, but typically performed outside the shipping container). The forklift 505 is then operated to retrieve the stocked pallet (e.g. 507) and transport it out of the shipping container to a desired destination, for example, a staging area where it can be loaded onto a truck or the like.

As described above, the length of the platform, front-to-rear, is about 2200 mm. In contrast, the pallets 512 are about 1000 mm long. Thus, the pallets 512 take up only about half of the length of the platform 20. Similarly, the tines of the 506 of the forklift 505 are about 1000 mm long. Because the forklift 505 cannot pass onto the platform 20, the tines 506 can reach at most about half the length of the platform 20. No other part of the forklift 505 can extend further onto or over the platform 20 than the tines. Thus, the platform 20 may be regarded as having two areas: a front area 20A which is within reach of the forklift 505 and may be regarded as a potentially hazardous area; and a rear area 20B which is not within reach of any part of the forklift 505 and which may therefore be regarded as an area that is safe for ground personnel 509.

The apparatus 10 therefore acts as a physical barrier which provides a substantially safe area 20B for ground personnel within a shipping container when there is a forklift or other powered MHE within the shipping container.

It will further be appreciated that provided the ground personnel remains on the platform 20, the safe area 20B is only ever a metre or so away, and is therefore easily and quickly accessible. Further, even the front area 20A, while not as safe as the rear area 20B, provides an area within the shipping container in which the risk of accidental injury by a forklift or the like is substantially less than in the part of the shipping container in which the wheeled parts of the forklift may operate. Thus, incidents of personnel being inadvertently crushed or seriously impacted by forklifts can be avoided or at least substantially reduced.

This is considered to sufficiently reduce the risk of injury from having both ground personnel and a forklift or other powered MHE within a shipping container simultaneously to make this a reasonable working practice, contrary to the situation without the apparatus 10.

It should be appreciated that further safety benefits stem from use of the apparatus 10.

Avoiding the need to have personnel exit the container immediately prior to entry by a forklift can reduce the incidence of accidents immediately outside the shipping container.

Further, provision of a relatively safe work area inside the shipping container can allow personnel to wrap the palletised goods in this safe area. Previous practice has sometimes been to load the pallet, remove the loaded pallet from the shipping container and wrap the palletised goods immediately outside the shipping container. The area in which the pallet may be wrapped is often an area from which pallets are collected by forklifts so that wrapping in this area requires ground personnel to be engaged in this task in an area in which forklifts operate, resulting in an increased accident risk. The accident risk is considered lower if the wrapping occurs within the shipping container but in an area into which fork lift trucks and the like cannot enter.

Having personnel working on a slightly elevated platform can reduce manual handing related injuries when handling cartons positioned above shoulder height. It is estimated that use of an elevated platform will mitigate controllable manual handling hazards (lifts or movements that can be controlled) outside of the ergonomic power zone by approximately 90%.

Further, the apparatus 10 allows shoring bars to be easily positioned close to the remaining stacks of cartons or other materials to help prevent falling stock should this risk be present. This can assist in keeping the unload team safe from stock collapse and resulting injury from falling stock. In addition to safety benefits, this can provide a significant economic benefit resulting from reduced incidents of damage to products by falling. Further stock falls in containers can result in the container interior being deemed unsafe, sometimes resulting in entire containers being transported off site for unpack in a more controlled (and less economical) environment.

The wheels enable the apparatus 10 to be manually movable when progressing the work at hand (loading or unloading pallets of stock/cartons). Moving the apparatus along the length of the container allows the apparatus to be positioned adjacent to remaining cargo as the container is unpacked. This allows both the platform upon which personnel stand during unpacking to be conveniently and ergonomically close to the remaining cargo, and allows the barrier (to forklifts and the like) provided by the apparatus to be moved as unpacking progresses so that the movement of forklifts is restricted only as much as is required to provide a safe area for personnel between the forklift/MHE accessible area and the remaining cargo. The braking capability prevents the apparatus from inadvertently rolling inside the container which is important as the containers being unpacked cannot be guaranteed to be level, whether they are on the ground or on a trailer. The brake may also assist in securing the apparatus in a desired position against inadvertent movement caused by the forklift (or other powered MHE) accidentally pushing against the apparatus.

While the above description of the apparatus 10 has been largely with reference to unpacking shipping containers, it will be appreciated that the disclosure also relates to packing (or 'stuffing') of shipping containers. For example, a forklift may deposit palletised cartons (or other material or cargo) onto the front region of the platform and personnel may then remove the cartons from the pallet and stack them in a part of the storage container on the rear side of the apparatus. The apparatus 10 may be moved towards the open end of the shipping container, as required, to provide additional space to the rear of the apparatus in which to stack cartons or the like.

An alternative embodiment of an apparatus for use in packing and unpacking shipping containers is illustrated in FIGS. 6 to 14.

Figure 6:
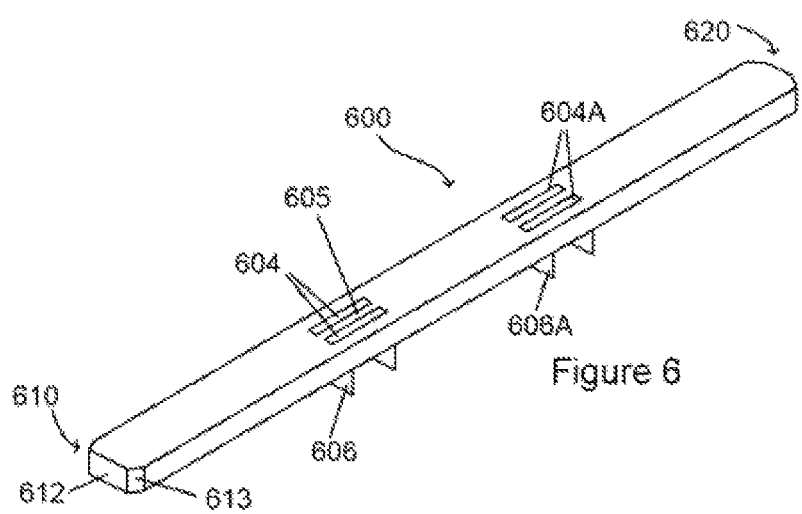
FIG. 6 is a schematic perspective view of a different embodiment of an apparatus for packing and unpacking shipping containers in accordance with the present disclosure.
Figure 7:
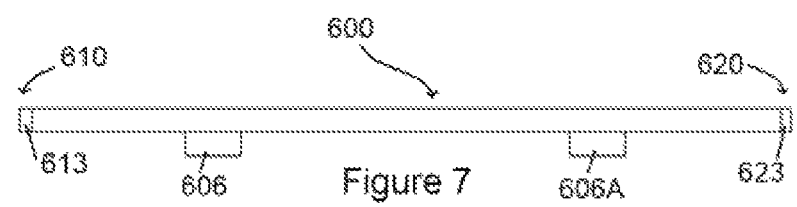
FIG. 7 is a front view of the apparatus of FIG. 6.
Figure 8:
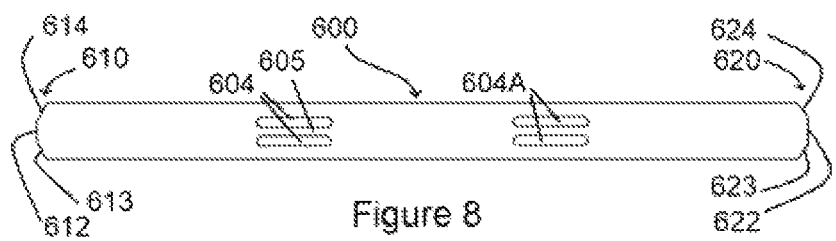
FIG. 8 is a schematic top view of the apparatus of FIG. 6.

With particular reference to FIGS. 6 to 8, the apparatus, generally designated 600, is, in this embodiment, in the form of a barrier (also referred to by the reference numeral 600). The barrier 600 is adapted to be located and retained at a substantially fixed position within a shipping container by virtue of a first end region 610 of the barrier 600 being located, and in use retained, in a recess in a first side wall of the shipping container and a second end region 620 of the barrier 610 being located, and in use retained, in a recess in a second side wall of the shipping container.

It will be appreciated that a standard and widely used form of shipping container has walls, and in particular side walls, formed from panels of corrugated steel. In such shipping containers, the side walls have a corrugated form that provides a number of vertically extending recesses or shallow open channels. A schematic horizontal cross section of a corrugated part of each of two such side walls is shown in FIG. 9, along with a schematic illustration of the retention of the barrier 600 by the recesses of the side walls.

Figure 9:
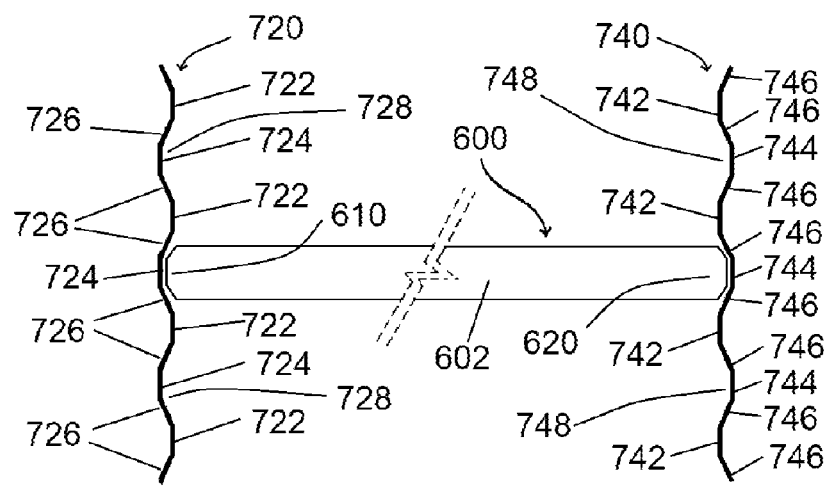
FIG. 9 is a schematic top view of the apparatus of FIG. 6 in use, with the ends thereof located in recesses in respective opposed side walls of a shipping container.
Figure 10:
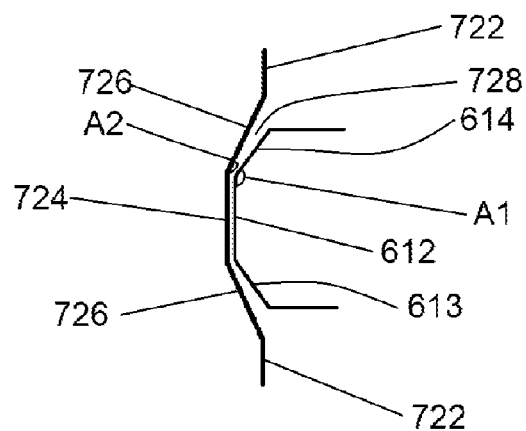
FIG. 10 is an enlarged view of part of FIG. 9, showing schematically the location of an end of the apparatus in a recess.

As shown in FIG. 9, a shipping container 700 has a first side wall 720 and a second side wall 740. The first and second side walls 720, 740 generally correspond, so that only the first side wall 720 will be described in detail. The first side wall 720 provides a number of inner wall portions 722 which are substantially coplanar and may be regarded as defining an interior plane of the side wall 720 of the shipping container 700. That is, a measurement of the interior width of the shipping container 700 may be regarded as the distance between a point on one of the inner wall portions 722 of the first side wall 720 and the closest point on an opposed inner wall portion 742 on the opposite, second, side wall 740. The first side wall 720 further provides a number of outer side wall portions 724 displaced outwardly from the inner wall portions 722 in the width or lateral direction of the shipping container 700. Each of the inner and outer wall portions 722, 724 is in the form of a relatively narrow but tall rectangular panel portion (not shown), with substantially vertical long sides.

The inner and outer wall portions 722, 724 alternate along the length of the shipping container 700. Ignoring the very end parts of the shipping container, each inner wall portion 722 is therefore located between, in the length direction of the shipping container 700, two neighbouring outer wall portions 724, and each outer wall portion 724 is located between (in the length direction of the shipping container) two inner wall portions 722.

The inner and outer wall portions are spaced apart from each other in the length direction of the shipping container 700. Connecting each outer wall portion 724 to each neighbouring inner wall portion 722 is a connecting panel portion 726 which extends in both the lateral and lengthwise direction of the shipping container. Thus each outer wall portion 724 and the two adjacent connecting panel portions 726 may be regarded as defining a shallow, vertically oriented, recess 728 in the first side wall 720 of the shipping container. Each recess 728 may be regarded as having a cross sectional profile (in horizontal cross section) shape like a wide, flat-bottomed, letter V, with the outer wall portion 724 providing the flat bottom of the V and with the two connecting panel portions 726 neighbouring that outer wall portion providing the sloping arms of the V.

Corresponding recesses 748 are provided in the second side wall 740. The vertical recesses 728, 748 in opposite side walls of a shipping container are normally substantially opposed, that is, substantially aligned in the lateral direction of the shipping container.

In a particular form of widely used shipping container, the inner wall portions 722, 742 and the outer wall portions 724, 744 are approximately 71 mm (2.8 inches) wide. The connecting panel portions 726 extend approximately 36 mm (1 7/16 inches) inwardly (in the lateral direction of the shipping container) between the inner wall portions 722, 742 and the outer wall portions 724, 744, and extend approximately 68 mm (2.7 inches) in the length direction of the shipping container. The angle, A2, between each outer wall portion 724, 744 and the adjoining connecting panel portion 726 is approximately 152 degrees. The internal width of the shipping container, that is, the perpendicular distance between the planes defined by the inner wall portions 722, 742 is approximately 2352 mm. The perpendicular distance between the planes defined by the outer wall portions 724, 744 is approximately 2424 mm.

As illustrated, the apparatus 600 comprises an elongate, substantially rigid, body, having dimensions carefully determined to allow it to be retained in position by interaction of its end regions 610, 620 with the recesses 728, 748 provided by the shaped side walls of a shipping container, when horizontal and oriented laterally across a shipping container. Further, the height and robustness of the apparatus 600 are sufficient to allow it to act as an effective barrier to the wheeled parts of forklift trucks and the like (MHE).

In the illustrated embodiment, the apparatus 600 provides a main body part 602 of substantially uniform width, and the first and second end regions 610, 620, are each shaped to facilitate and/or accommodate location in a recess of a side wall (e.g. 720, 740) of a shipping container.

Each shaped end region 610, 620 comprises a terminal region 612, 622 which comprises an end edge or face oriented substantially perpendicular to the direction of elongation of the barrier 600. Each shaped end region 610, 620 further comprises at least one tapered shoulder portion 613, 614, 623, 624, which each provide a tapered or bevelled edge or face, and a transition between the width of the respective terminal region 612, 622 and the width of the main body part 602. In the illustrated embodiment, the barrier 600 provides capping at the shaped end regions 610, 620 to provide faces of the terminal regions 612, 622 and tapered shoulder portions 613, 614, 623, 624. The capping may be provided by plate aluminium, for example, 6 mm thick plate aluminium which may be welded to the rest of the barrier.

The terminal region 612, 622 is preferably equal, or smaller, in width than the outer wall portion 724 of the recess 728, within which the terminal region is to be retained in use. It will be appreciated that if the terminal region 612, 622 is greater in width than the outer wall portion 724, then this will prevent the corresponding end of the barrier 600 from being able to be received all the way into the corresponding recess 728, 748. See FIGS. 15(a) to (g) and the corresponding description, for some further detail on variants of the shape of the end regions 610, 620 of the barrier 600.

The main body part 602 of the barrier 600 is, in this embodiment, formed from a length of suitable aluminium section, for example C-section. A suitable C-section has a width of approximately 152 mm (6 inches), a height of approximately 65.5 mm (2.6 inches) and a wall thickness of approximately 7.9 mm (0.31 or 5/16 inches).

The main body part 602 of the barrier 600 is provided with two or more slots 604, and, in the illustrated embodiment, two pairs of parallel elongate slots are provided in the in-use upper wall thereof. Each pair of slots provides a conveniently sized region 605 between the two slots of the pair, which acts as a handle and facilitates lifting and other moving and manipulation of the barrier 600 by a user. In this embodiment, the regions 605 which acts as handles do not project from the rest of the barrier 600, so inadvertent engagement by a foot of personnel, or by a tine of a forklift is substantially avoided.

The main body part 602 of the barrier 600 is provided with two or more feet 606, 606A, which in use support the main body part 602, and space the maim body part from a floor of the shipping container to give the barrier 600 a desired height above the floor, that is, a height sufficient to allow the barrier 600 to provide a physical restraint against passage of the wheeled part of a MHE such as a forklift. The feet 606, 606A may be of any desired and suitable material, construction and configuration. In the illustrated embodiment, the feet 606, 606A are formed from short lengths of the same type of metal section as is used to form the main body part 602. In the illustrated embodiment, the feet 606, 606A are substantially square in plan view, and can be regarded as having a length and a width both substantially equal to the width of the main body part 602. The feet may be attached to the main body part 602 in any suitable manner, for example, by welding.

The feet may be arranged so that the axis of the metal section from which they are formed is oriented perpendicular to the direction of elongation of the barrier 600, as illustrated schematically in FIG. 6, or so that the axis of the metal section from which they are formed is oriented parallel to the direction of elongation of the barrier 600, as illustrated schematically in FIG. 7.

The feet 606, 606A, are spaced apart, in the illustrated embodiment, by a distance equal to about half the length of the barrier 600. Further, in the illustrated embodiment, the feet are spaced away from the end regions 610, 620 of the barrier 600, to avoid interference with the engagement of the end regions 610, 620 with the container wall (or the necessity of shaping the feet to avoid such interference).

An advantage of using feet to provide the desired height for the barrier, rather than using a metal section with the desired barrier height, is that less material is required to manufacture the barrier, which helps avoid unnecessary cost and weight. The illustrated embodiment 600 has a weight of about 12 kg (about 26 pounds). This low weight assists in facilitating lifting and other moving and manipulation of the barrier 600 by a user and in avoiding substantial resultant fatigue and/or injury.

In a particular embodiment, intended for use with a shipping container 700 having dimensions described above, the barrier 600 has dimensions as follows.

The elongate length of the barrier 600, between the end faces provided by the terminal regions 612, 622, is approximately 2410 mm.

The lateral width of the main body part 602 is approximately 152 mm.

The width of each of the terminal regions 612, 622 is approximately 60 mm.

The shoulder portions 613, 614, 623, 624, each extend approximately 40 mm in the direction of elongation of the barrier 600, and approximately 46 mm in the lateral direction of the barrier. An angle, A1, between each of the shoulder portions 613, 614, 623, 624 and the associated terminal region 612, 622 is approximately 146 degrees. Thus the angle of the shoulder portions 613, 614, 623, 624, relative to the direction of elongation of the barrier 600 is approximately 56 degrees.

The width of each of the terminal regions 612, 622 is smaller than the width of the outer wall portions 724, 744. Thus, in use, a terminal region 612 or 622 can abut the corresponding outer wall portion 724, 744.

The angle A1, between each terminal region 612, 622 and an associated shoulder portion 613, 614, 623, 624, is less than the angle A2 between each of the outer wall portions 724, 744 and each connecting panel portion 726, 746. Thus the shoulder portions 613, 614, 623, 624 diverge away from the connecting panel portions 726, 746 as they extend outward relative to the recess.

It should be appreciated that the elongate length of the barrier 600 of (approximately) 2410 mm is greater than the (approximately) 2352 mm perpendicular distance between the planes defined by the inner wall portions 722, 742, and less than the (approximately) 2424 mm perpendicular distance between the planes defined by the outer wall portions 724, 744.

This elongate length is selected so that, in use, with the barrier 600 parallel to the floor of the shipping container 700 and extending transversely across the shipping container 700 when a first terminal region 612 is located within a recess 728 of the first side wall 720 of the shipping container, the second terminal region is located at least partially within a recess of the 744. Thus, in use, the barrier 600 is retained in position by interaction of its end regions 610, 620 with the recesses 728, 748 provided by the corrugated side walls of the shipping container 700.

At least the width dimensions of shipping containers are reasonably standardised, so it is anticipated that the specific dimensions discussed above will be applicable to most shipping containers that are used commercially at the time of writing. However, it should be appreciated that different types of shipping containers may have different widths, so that different lengths of barrier may be required for different types of shipping container. Disclosure regarding assessing and determining appropriate and desirable lengths of barrier which is applicable to different widths of shipping container (rather than solely in relation to a specific type of shipping container) is therefore provided below.

A desirable length L of a barrier similar to the barrier 600, can be expressed more generally as:

$$WI+((WMI-WI)/2)<L<WMI \quad \text{(Expression 1)}$$

where, the lateral distance between opposed inner wall portions (as exemplified by inner wall portions 722, 742), which may be regarded as the internal width of the shipping container, is WI, and the lateral distance between opposed outer wall portions (as exemplified by outer wall portions 724, 744), which may be regarded as the maximum internal width of the shipping container, is WMI. It should be appreciated that the dimensions of shipping containers are normally available in documentary form, so that numerical values referred to herein for the various dimensions of shipping containers, may be ascertained from any suitably reliable source of this information, and need not be ascertained by physically measuring a shipping container (although this can be a viable option).

By way of example, for the shipping container 700, discussed above, this gives:

2352+((2424−2352)/2)<L<2424, which is

2388<L<2424.

It can be seen that the elongate length of the barrier 600 of (approximately) 2410 mm is comfortably within this range.

An alternative type of shipping container, sometimes known as the 40′ high-cube container, is believed to have a lateral distance between opposed inner wall portions, WI, of approximately 2311 mm, and a lateral distance between opposed outer wall portions, WMI, of approximately 2383 mm.

Using Expression 1, a desirable length L of a barrier similar to the barrier 600, but for use with such a shipping container (the 40′ high-cube container) is:

2311+((2383−2311)/2)<L<2383, which is

2347<L<2383.

It will be appreciated that Expression 1 allows the desirable length for a barrier similar to the barrier 600, for a particular type of shipping container with corrugated side walls to be determined from consideration of the (minimum) internal and maximum internal widths, corresponding to WI and WMI, respectively.

Alternatively, an expression for the desirable length fora barrier of the similar to the barrier 600, can use one of these widths along with the depth of the recesses (exemplified by recesses 728, 748).

Using the (minimum) internal width MI and the depth of each recess, designated DR, a desirable length L of a barrier similar to the barrier 600, can be expressed as:

$$WI+DR<L<WI+2DR \quad \text{(Expression 2)}$$

Using the maximum internal width WMI and the depth of each recess, designated DR, a desirable length L of a barrier similar to the barrier 600, can be expressed as:

$$WMI-DR<L<WMI \quad \text{(Expression 3)}.$$

It will be appreciated that assuming that the shipping container geometries are such that the difference between WI (the lateral distance between opposed inner wall portions, as exemplified by inner wall portions 622, 642) and WMI (the lateral distance between opposed outer wall portions, as exemplified by outer wall portions 624, 644) is twice the recess depth, or 2DR, Expressions 2 and 3 will give the same ranges as Expression 1.

It will be appreciated that Expressions 1 to 3 above, include a shortest length for the barrier which is only slightly greater than the (minimum) inner interior width WI plus the depth of one recess. Selecting this length for a barrier could allow one end of the barrier to be fully inserted into a recess in one side wall, and the other end of the barrier to be protrude into, or be received by, the opposed recess only minimally. Expressions 1 to 3 above, also include a longest length for the barrier which is only just shorter than the distance between two opposed outer wall portions. Selecting this length for a barrier could allow each end of the barrier to simultaneously abut (or be only minimally spaced from) the outer wall portions 724, 744 of the two side walls. These shortest and longest lengths might not provide a reliably operable barrier, since the shortest length may fail to allow reliable retention in both of the opposed recesses, and the longest length may result in the barrier becoming jammed, or otherwise difficult to remove from, between the outer wall portions 724,744. These potential issues are particularly relevant when the barrier is to be used in a previously used shipping container, as even light or moderate damage or impact to the shipping container, can result in deformations, such as dents and the like, in the wall portions with which the barrier interacts.

It is therefore desirable to slightly increase the value in the range for the minimum length, and to slightly decrease the value in the range for the maximum length. An adjustment of 10 mm to the value at each end of the range is considered suitable, to provide desired depth of penetration into recesses, and clearance from at least one outer wall portion.

Applying this 10 mm moderation at each end of each range provides the following expressions for the desirable length L of a barrier similar to the barrier 600:

$$WI+((WMI-WI)/2)+10\ mm<L<WMI-10\ mm \quad \text{(Expression 1A)}$$

$$WI+DR+10\ mm<L<WI+2DR-10\ mm \quad \text{(Expression 2A)}$$

$$WMI-DR+10\ mm<L<WMI-10\ mm \quad \text{(Expression 3)}.$$

Further, to provide additional certainty that the barrier will be securely retained in the recesses, it may be particularly desirable to provide the barrier with a length that is in the upper half, or even at upper quarter of this range.

By way of example, for the container 700, each of these Expressions 1A, 2A and 3A give a desirable length L of the barrier 600, of:

2398<L<2414.

Again, it can be seen that the elongate length of the barrier 600 of (approximately) 2410 mm is comfortably within this range. Further, the length of 2410 mm is in the upper half of this range and, more specifically, at the upper quarter of this range.

Considered assessment of the container dimensions in determining a length for a barrier can allow provision of a barrier of fixed length, with confidence that the fixed length barrier will adequately perform the functions described herein. While barriers of adjustable length, for example, using lockably telescoping metal sections, or with suitable lockably movable extension/retractable members at one or both end regions which can effectively provide length adjustment, should be considered within the scope of the present disclosure, provision of a fixed-length barrier is considered to have substantial advantages, including economy and simplicity of manufacture, and reduced likelihood of user-error leading to the barrier failing to be properly and securely located in use. It should be appreciated that reference herein to the barrier being of fixed length is intended to indicate that the length is not intended to adjustable (but not to mean that the length is not susceptible to small changes by normal mechanisms such as thermal expansion).

Figure 11:
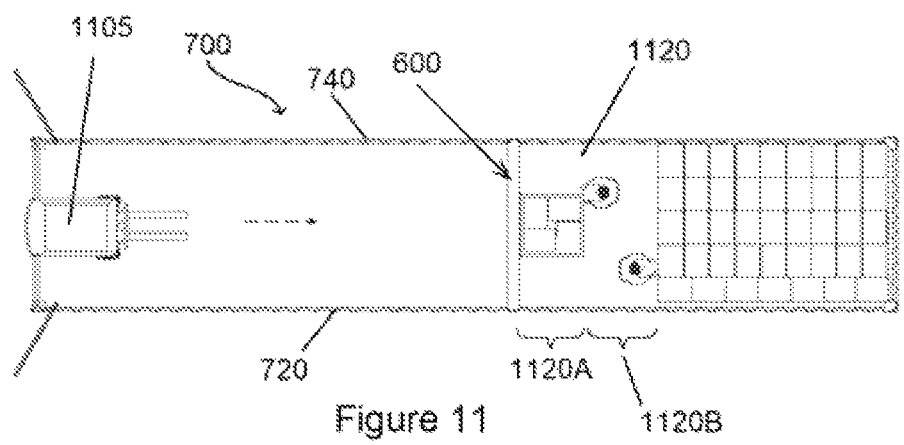
FIG. 11 is a schematic plan view illustration of the apparatus of FIG. 6 in use during unpacking of a shipping container.
Figure 12:
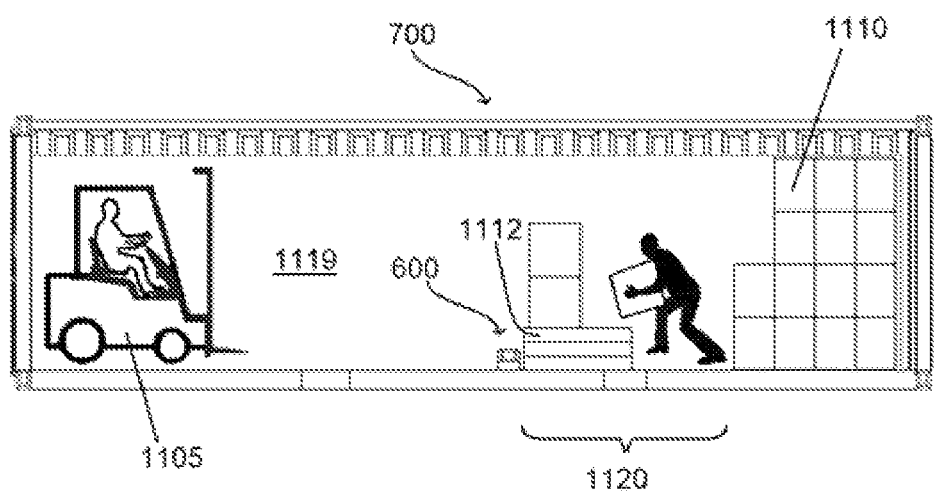
FIG. 12 is a schematic side view illustration of the apparatus of FIG. 6 in use during unpacking of a shipping container.

FIGS. 11 and 12 illustrate schematically, use of the barrier 600 within the shipping container 700, during unpacking of the shipping container 700.

As illustrated schematically in FIGS. 11 and 12, the barrier 600 has been positioned across the width of the shipping container 700, with each of the end regions 610, 620 located and retained in recesses (not shown in FIGS. 11 and 12) provided by the corrugated side walls 720, 740 of the shipping container 700, as described previously. It will be appreciated that the barrier can be placed into position without difficulty, by a user holding the barrier 600 by the handles provided by the slots 604, 604A, inclining the barrier away from the horizontal, inserting one end region into a recess in one of the side walls, and orienting the barrier so that it is horizontal and resting on the floor of the shipping container, so that the first and second end regions 610, 620 are located in substantially opposed recesses (not shown in FIGS. 11 and 12) provided by the first and second corrugated side walls 720, 740 of the shipping container 700. Inclining the barrier 600 to an angle from the horizontal of about 15 to 30 degrees is ample to allow placement (although this does not preclude a worker inclining the barrier to a greater angle).

The height to which the barrier 600 extends above the surface on which it is supported (in use, typically the floor of the shipping container 700) is about 131 mm. This height is sufficient to ensure that a typical forklift 1105 or other powered material handling equipment (MHE) cannot be driven over the barrier, not least because the tine-supporting rails at the front of a typical forklift used in shipping containers have a ground clearance of less than this height. The barrier 600 is therefore substantially impassable (or at least which cannot be inadvertently passed) by the forklift 1105 or other powered MHE. Of course, if required by the anticipated circumstances of use, such as use with a particular type of powered MHE with a greater ground clearance, then a barrier of greater height may be used.

The barrier 600 therefore effectively defines a boundary between an area 1119 of the shipping container in which a forklift or MHE operates and a working area 1120 from which forklifts are excluded, and which is therefore relatively safe for ground personnel.

As illustrated in FIGS. 11 and 12, a worker, or ground personnel 1109, work in the working area 1120, manually moving cartons from stacks of cartons 1110 onto pallets 1112.

The pallets 1112 onto which the ground personnel 509 is placing the cartons are placed in a stack close to the barrier 600. When the top pallet 1112 is adequately filled with cartons from the stacks of cartons 1110, the ground personnel may wrap the cartons loaded onto the pallet with plastic wrap (an operation known per se, but typically performed outside the shipping container, as discussed previously).

The forklift 1105 is then operated to retrieve the stocked top pallet 1112 and transport it out of the shipping container to a desired destination, for example, a staging area where it can be loaded onto a truck or the like. The forklift 1105 is able to retrieve the stocked top pallet 1112 by passing its tines over the top of the barrier 600, and into tine-receiving openings of the pallet 1112, because the pallet is elevated above the height of the barrier 600, as it is supported by the lower pallets of the stack of pallets. A typical height of a pallet (depending on factors such as the type of pallet and local convention) is between about 140 mm and 170 mm, so for a barrier height of about 131 mm the barrier would only prevent the forklift from retrieving the bottom-most pallet.

Of course, if desired, some support other than lower pallet(s) of a stack of pallets may be used to support one or more pallets at a height suitable for retrieval by a forklift. Such alternative supports may be, for example, a platform, a suitable frame or any other support suitable for supporting pallets at a suitable height above the floor of the shipping container. Such alternative supports may be provided as part of a barrier or as separate items to the barrier. However, it is considered convenient and economical to use lower pallet(s) of a stack (including a pair) of pallets.

It will be appreciated that, as illustrated in FIGS. 11 and 12, the shipping container 700 has been partially unpacked so that only about a 15 to 25 percent of its length is filled with stacked cartons 1110 at the stage shown. Further, it will be appreciated that the apparatus 600 is repositioned along the length of the shipping container 700, from time to time, as the shipping container 700 is unpacked so that the barrier 600 is, in use, reasonably close to the accessible cargo, e.g. cartons 1110, that is yet to be unpacked. If desired, for example, because it is desired to reposition the barrier 600 infrequently, a manual pallet trolley may be used to move pallets between the stacked cartons and the barrier.

Although the entirety of the working area 1120 is relatively safe for ground personnel compared to the area 1119 in which forklifts can operate, the working area may be regarded as having a less safe area 1120A which is closer to the barrier 600, and within reach of the tines of the forklift 1105 and a more safe area 1120B, further from the barrier 600, which is not within reach of any part of the forklift 505. It may be desirable to have ground personnel retreat to the more safe area when the forklift approaches the barrier to engage a pallet.

It will be appreciated that provided the ground personnel remains in the working area 1120, typically further from the opening of the shipping container than is the barrier 600, the more safe area 1120B is only ever a metre or so away, and is therefore easily and quickly accessible. Thus, incidents of personnel being inadvertently crushed or seriously impacted by forklifts can be avoided or at least substantially reduced.

Packing a shipping container may be performed as substantially the reverse of the unpacking procedure described above. That is, the barrier 600 is placed at a suitable position to provide a working area within which cartons are to be stacked, one or more pallets (or other support for spacing a loaded pallet from the container floor) is placed in the working area 1120 adjacent the barrier, a forklift then deposits a loaded pallet atop the support (e.g. pallet(s)) while the ground personnel are within the working area (and, for greatest safety, within the more safe area 11208 of the working area 1120) and then withdraws, and the ground personnel then pack the cartons from the pallet into the shipping container by stacking them as desired. When the pallet is empty (unloaded), the forklift deposits another loaded pallet, and so on, until the container is packed, with repositioning of the barrier 600 as desired. However, a preferred method for packing a shipping container is disclosed below, with reference to FIGS. 13 and 14.

Figure 13:
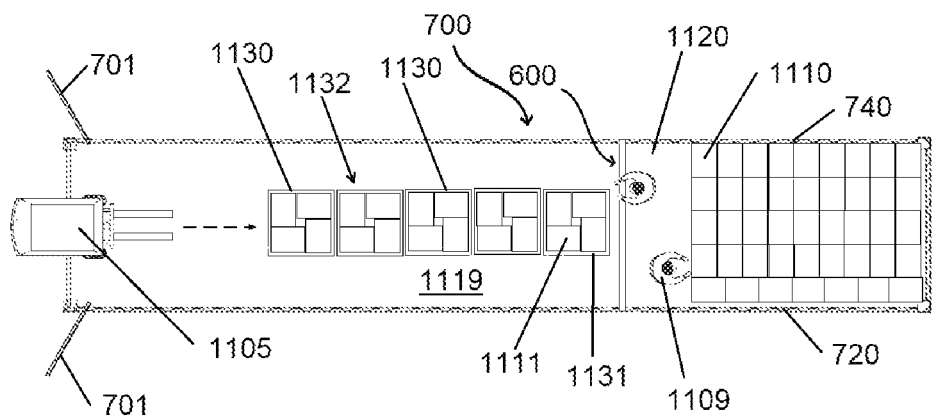
FIG. 13 is a schematic plan view illustration of the apparatus of FIG. 6 in use during packing of a shipping container.
Figure 14:
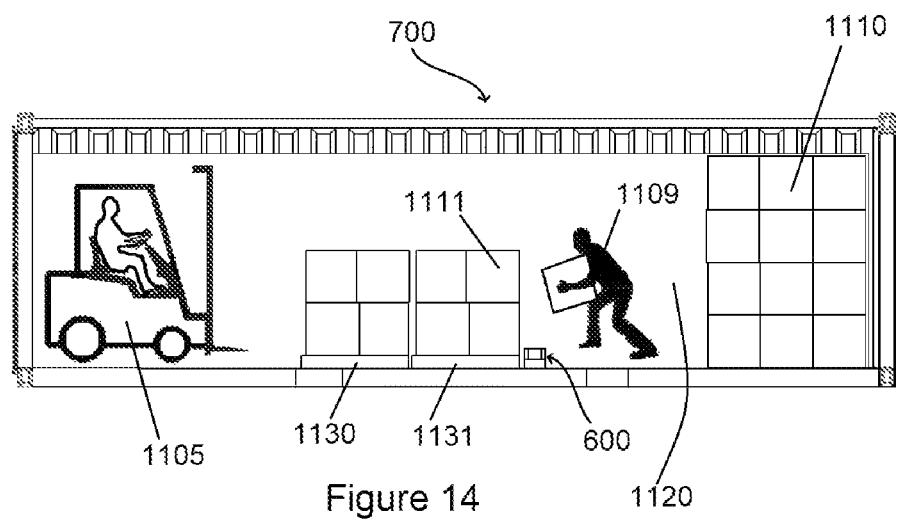
FIG. 14 is a schematic side view illustration of the apparatus of FIG. 6 in use during packing of a shipping container.

FIGS. 13 and 14 illustrate schematically, use of the barrier 600 within the shipping container 700, during packing of the shipping container 700.

As illustrated schematically in FIGS. 13 and 14, the barrier 600 has been positioned across the width of the shipping container 700, with each of the end regions 610, 620 located and retained in recesses (not shown in FIGS. 13 and 14) provided by the corrugated side walls 720, 740 of the shipping container 700. The barrier 600, therefore, effectively defines a boundary between an area 1119 of the shipping container in which a forklift or MHE operates and a working area 1120 from which forklifts are excluded, and which is therefore relatively safe for ground personnel 1109.

Loaded pallets 1130 are deposited onto the floor of the shipping container in a line 1132 extending in the direction of elongation of the shipping container 700. The entire line 1132 of pallets is pushed (or shunted) towards the barrier 600, until the forward most loaded pallet 1131 is close to the barrier 600. The cartons 1111 on the forward most loaded pallet 1131 are then accessible by ground personnel 1109, working in the working area 1120, who remove the cartons 1111 from the forward most loaded pallet 1131 and pack them into stacks of cartons 1110, starting from the end of the shipping container 700 further from the opening/doors 701 of the shipping container 700.

When the forward most pallet 1131 is empty, the ground personnel remove the empty pallet from the front of the line, and put it aside, for example leaning it in a near vertical orientation against a wall of the shipping container.

When the forward most pallet 1131 is removed from the front of the line, the barrier 600, may be repositioned if desired, for example, if the barrier is considered too close to the progressively extending region of stacks of cartons 1110.

After any repositioning of the barrier, and after the ground personnel have indicated or confirmed to the operator of the forklift that they are safely within the working area 1120, the line of loaded pallets is shunted forward by the forklift until the new forward most loaded pallet 1131 is close to the barrier 600. Unloading of this pallet, and stacking of the cartons, can then commence.

The operator of the forklift 1105, may use the time during which the ground personnel are unloading the cartons 1111 from the forward most loaded pallet 1130 to replenish the line of pallets, but not to push or shunt forward the line of pallets, as the forklift operator may not have certainty that the ground personnel will remain within the working area during unloading. Pushing forward the line of pallets can only be performed when the ground personnel are within the working area, and the forklift operator has certainty of this.

The above steps can be repeated until the shipping container is substantially packed.

The barrier 600 can be repositioned as required with a view to keeping the distance between the pallet being unloaded (the 'pick up point') and the location where the cartons are being stacked (the 'placement point') as small as is conveniently reasonable. This can reduce fatigue and the risks associated with manual handling, such as strains and sprains.

It should be appreciated that during the packing of a shipping container as illustrated in, and described with reference to FIGS. 13 and 14, a primary function of the barrier 600 is to prevent pallets from being pushed into the working area 1120, rather than only to act as a barrier to entry of forklifts (powered MHE) into the working area. However, the barrier 600 is nonetheless required to act as a barrier to entry of forklifts (powered MHE) into the working area 1120, to provide a high level of confidence in the safety of ground personnel 1109 who are within the shipping container at the same time as an operating forklift.

FIGS. 15(a) to (g) illustrate schematically, some variants of the shape of the end regions 610, 620 of the barrier 600.

FIG. 15(a) illustrates schematically, an embodiment of a barrier, generally designated 1500A, in which each end region, e.g. 1510A, is shaped similarly to the end regions 610, 620 of the barrier 600, but in which the overall width of the barrier is smaller. Similarly to the barrier 600, the width of each of the terminal regions, e.g. 1512A, is equal to or smaller than the width of the outer wall portions 724. Thus, in use, a terminal region 1512A can abut the corresponding outer wall portion 724. Shoulder portions 1513A, 1514A diverge away from the connecting panel portions 726, as they extend outward relative to the recess. This arrangement of end regions is considered reasonably effective, for reasons that will be appreciated from the foregoing description of the barrier 600, but potentially less stable in use, due to the reduced with. That is, the barrier 1500A may be more susceptible to tipping or toppling than the barrier 600 due to the reduced width.

FIG. 15(b) illustrates schematically, an embodiment of a barrier, generally designated 1500B, in which each end region, e.g. 1510B, is shaped similarly to the end region 610, 620 of the barrier 600, but in which shoulder portions 1513B, 1514B are substantially parallel with the connecting panel portions 726, rather than diverging away as they extend outward relative to the recess. This arrangement is considered reasonable effective, for reasons that will be appreciated from the foregoing description of the barrier 600, but may be more susceptible to becoming caught on irregularities in the connecting panel portions 726 than the barrier 600 if of the same length.

FIG. 15(c) illustrates schematically, an embodiment of a barrier, generally designated 1500C, in which (like the barrier 600 and the barrier 1500A) shoulder portions 1513C, 1514C diverge away from the connecting panel portions 726, as they extend outward relative to the recess. However, each terminal region. For example terminal region 1512C is greater in width than the outer wall portion 724. It will be appreciated that this will prevent the corresponding end of the barrier 1500C from being able to be received all the way into the corresponding recess 728. While such an arrangement can still allow the first and second end regions of the barrier to be retained in opposed recesses 728, 748, so that the barrier can be retained in position by interaction with the shaped side walls of a shipping container, this arrangement may, depending on the extent to which penetration into the recesses is reduced, undesirably reduce the security with which the barrier 1500C is retained in and by the recesses 728, 748 of the container side wall.

FIG. 15(d) illustrates schematically, an embodiment of a barrier, generally designated 1500D, in which (like the barrier 600) the width of each of the terminal regions, e.g. 1512D, is equal to or smaller than the width of the outer wall portions 724, but which does not include shoulder portions or a taper from the terminal region 1512D to the main body. While such an arrangement can still allow the first and second end regions (e.g. end region 1510D) of the barrier 1500D to be retained in opposed recesses 728, 748, so that the barrier can be retained in position by interaction with the shaped side walls of a shipping container, this arrangement results in a barrier narrower than the barrier 600 which is therefore potentially less stable, as described with reference to the barrier 1600A, and may also increase the likelihood of severe impact with the container side wall as relatively sharp, right angled corners 1514D may impact the connecting panel portions 726.

FIG. 15(*e*) illustrates schematically, an embodiment of a barrier, generally designated 1500E, in which (like the barrier 1500C) the width of each of the terminal regions, e.g. 1512E, is greater than the width of the outer wall portions 724, and which, (like the barrier 1500D) does not include shoulder portions or a taper from the terminal region 1512E to the main body. While such an arrangement can still allow the first and second end regions (e.g. 1510E) of the barrier to be retained in opposed recesses 728, 748, so that the barrier can be retained in position by interaction with the shaped side walls of a shipping container, this arrangement may, depending on the extent to which penetration into the recesses is reduced, undesirably reduce the security with which the barrier 1500E is retained in and by the recesses 728, 748 of the container side wall, and also (like the barrier 1500D) may also increase the likelihood of severe impact with the container side wall as relatively sharp, right angled corners 1514E may impact the connecting panel portions 726.

FIG. 15(*f*) illustrates schematically, an embodiment of a barrier, generally designated 1500F, in which each terminal region 1512F is greater in width than the outer wall portion 724, and in which (unlike the barrier 600 and the barrier 1500A) shoulder portions 1513F, 1514F are angled so that they converge towards the connecting panel portions 726, as they extend outward relative to the recess. However, each terminal region 1512F is greater in width than the outer wall portion 724. Again, such an arrangement can still allow the first and second end regions of the barrier 1522C to be retained in opposed recesses 728, 748, so that the barrier can be retained in position by interaction with the shaped side walls of a shipping container, but the reduction of the capacity of the end regions, e.g. 1510F, to penetrate into the recesses, e.g., 728, may, depending on the extent to which penetration into the recesses is reduced, undesirably reduce the security with which the barrier 1500F is retained in and by the recesses 728, 748 of the container side wall. Both the width of the terminal region 1512F and the angle of the shoulder portions 1513F, 1514F may contribute to the lack of penetration. Further, the convergence of the shoulder portions 1513F, 1514F and the connecting panel portions 726 may increase the risk of the end regions, e.g. 1510F, becoming caught on irregularities in the connecting panel portions 726.

FIG. 15(*g*) illustrates schematically, an embodiment of a barrier, generally designated 1500G, in which (like the barrier 600 and the barrier 1500A) the width of each terminal region 1512G, is equal to or smaller than the width of the outer wall portions 724, but in which (like the barrier 1500F) shoulder portions 1513G, 1514G are angled so that they converge towards the connecting panel portions 726, as they extend outward relative to the recess. Again, such an arrangement can still allow the first and second end regions of the barrier to be retained in opposed recesses 728, 748, so that the barrier can be retained in position by interaction with the shaped side walls of a shipping container, but the angle of the shoulder portions 1513G, 1514G may contribute to a lack of penetration of the end regions, e.g. 1510G into the recesses 728, and may increase the likelihood of the end regions, e.g. 1510G, becoming caught on irregularities in the connecting panel portions 726.

It will be appreciated that some possible shapes of the end regions of described barriers prevent full penetration of the end regions into the recesses 728, 748, provided by side wall of a shipping container. That is, some shapes prevent the terminal regions from contacting the outer wall portions (e.g. 724, 744) which normally define the deepest parts of the recesses. Further, it will be appreciate that Expressions 1 to 3 (and 1A to 3A) are to at least some extent based on an assumption that a minimum length L of the barrier 600 should be such that even when one terminal region of one end region of the barrier 600 is in contact with an outer wall portion 724, 744 of one recess 728, 748, at least part of the other end region will, in use, be at least partly located in the other, opposed, recess. If the end regions are shaped so that the terminal region cannot contact the outer wall portions, this minimum length of the barrier may need to be adjusted accordingly. Thus, taking an extreme (and likely dangerously impractical) example in which the end portions are shaped so that the terminal regions can only minimally enter the recesses, it can be seen that any length of the barrier that is greater than the internal width of the shipping container, WI, will result in the end portions being to some extent retained within the recesses. Thus a theoretical minimum length for a barrier is equal to the internal width WI. While it is emphasised that it is not suggested that a barrier with this length be put into practical effect, this length may be regarded as a lower limit of a range of lengths within which a suitable length for a barrier can be selected. To render the lower limit of the range safer, a lower limit of 20 mm greater than this length may be used.

Figure 16:
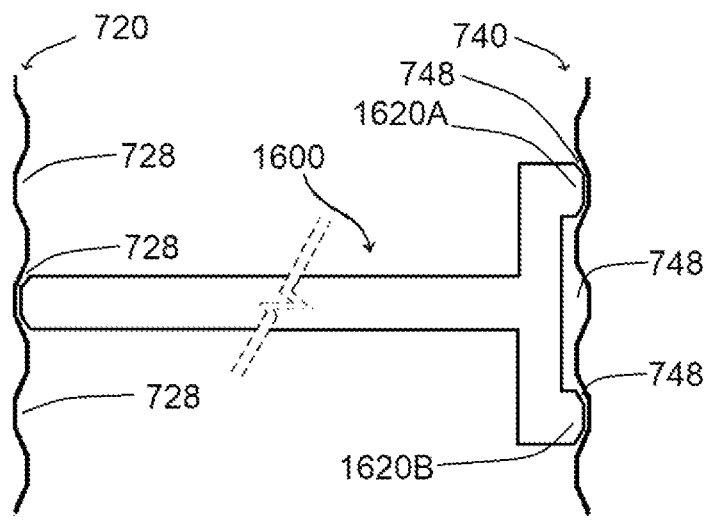
FIG. 16 is a schematic plan view illustration of an alternative embodiment, being a variation of the apparatus of FIG. 6.

FIG. 16 shows schematically and in plan view, an alternative embodiment 1600 in which a second end of the barrier provides two second-end regions 1620A, 1620B or which may alternatively be regarded as providing a second end region which includes more than one terminal part. Apart from this variation, the barrier 1600 may be similar to barriers discussed above with reference to the barrier 600. The embodiment 1600 also provides an example of an embodiment which engages offset recesses (e.g. 728, 748) of first and second side walls (e.g. 720, 740) of a shipping container 700, and which therefore does not engage directly opposed recesses (e.g. 728, 748) of the first and second side walls (e.g. 720, 740). If desired, a variation could be configured to provide two (or more) end regions at each of the first and second ends of the barrier. Many other variations are of course possible.

Figure 17:
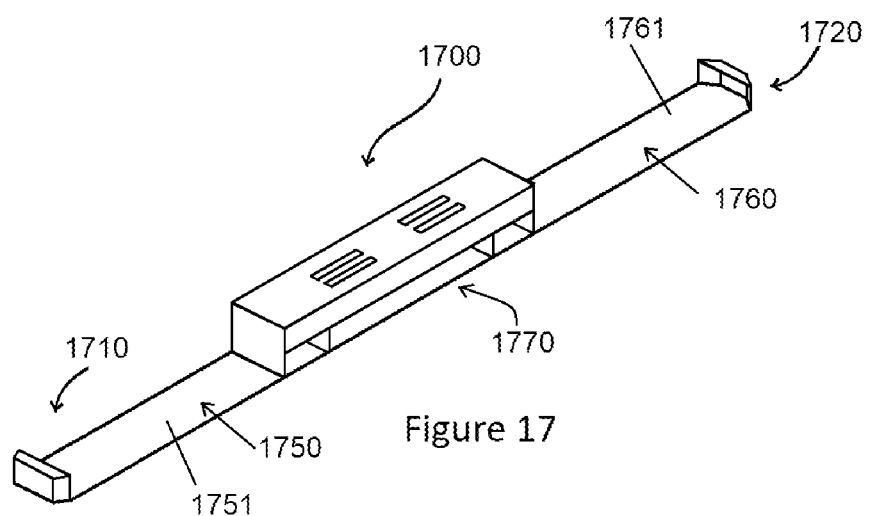
FIGS. 17, 18 and 19 are schematic perspective, side and top plan views, respectively, of an alternative embodiment.
Figure 18:
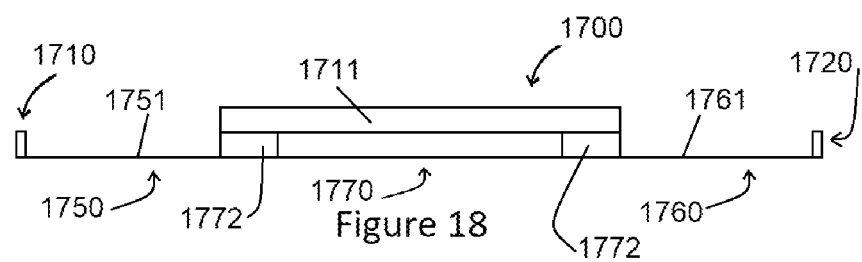
Figure 19:
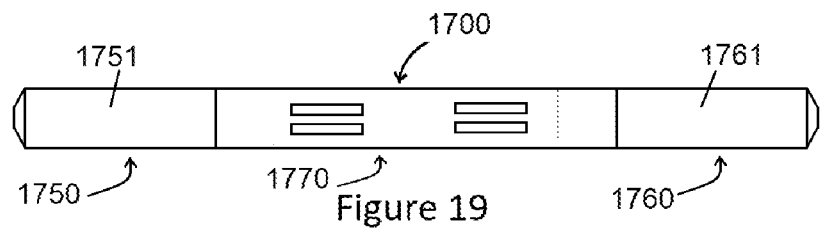

FIGS. 17, 18 and 19 are schematic perspective, side and top plan views, respectively, of an alternative embodiment in the form of a barrier, generally designated 1700, which is in many respects similar to the barrier 600. The barrier 1700 differs from the barrier 600 in that while the barrier 600 is substantially uniform in height along its length, the barrier 1700 provides one or more lesser-height regions 1750, 1760, of reduced or minimal height, along its length, in addition to one or more full-height regions 1770 of a height such that the barrier can effectively prevent passage of an expected type of powered MHE (e.g. forklift) past the barrier 1700.

The regions of different heights 1750, 1760, 1770, are dimensioned, and positioned along the axial length of the barrier 1700, so that in use the barrier 1700 will be effective to prevent passage of an expected type of powered MHE.

In the illustrated embodiment, the full height region 1770 is provided by an axially more central region of the barrier 1700, and the lesser height regions 1750, 1760, are provided close to the axial ends of the barrier 1700.

Like the barrier 600, the barrier 1700 has a first end region 1710 adapted to be located, and in use retained, in a recess in a first side wall of a shipping container and a second end region 1720 adapted to be located, and in use retained, in a recess in a second side wall of the shipping container, and has an overall length dimension, spacing apart the first and second end regions, to effect this.

In the illustrated embodiment, the barrier 1700 has a length of between 2388 mm and 2424 mm, and preferably towards (but not quite at) the upper end of this range, as has been discussed in detail above. The full-height region 1770 is about half the overall length of the barrier 1700 (i.e. about 1200 mm plus or minus a few centimetres) and each of the lesser height regions 1750, 1760, is about a quarter of the length of the barrier (i.e. about 600 mm plus or minus a few centimetres). In the illustrated embodiment, each of the end regions 1710, 1720 has an axial length of about 40 mm.

The full-height region 1770 may be structured similarly to a corresponding region of the barrier 600, in this example, by provision of a length of metal section 1711 mounted on supports 1772, or feet, which may be formed from the same type of metal section. The dimensions of the metal section may be the same as described above in relation to the barrier 600.

The lesser height regions 1750, 1760 may each be provided by a base plate portion 1751, 1761 formed, for example, of aluminium plate. In an embodiment, the base plate 1751 portions are formed of 11 mm thick aluminium. The base plate portions space the end regions 1710, 1720 from each other and from the full-height region 1770. In the illustrated embodiment, the base plate portions 1751, 1761 are both provided by a single base plate which also forms a base of the full-height region 1770.

In use, the full-height region 1770 is spaced apart from each side wall of the shipping container by one of the lesser height regions 1750, 1760, so that the spacing between the full-height region 1770 and each side wall is no more than about 60 cm (plus or minus a few cm). For a type of forklift that might be expected to be used within a shipping container, at least part of the tine- or fork-supporting rails (or other tine- or fork-supporting structure), which as discussed above provide a low ground clearance, will, in use, always be substantially more than 60 cm from the shipping container side wall which is closest to the forklift. Therefore, with the barrier 1700 in use, the full-height region 1770 will be suitably positioned to prevent passage of a forklift that might be expected to be used.

The lesser-height regions 1750, 1760 are therefore sufficiently axially short that they do not allow passage of an expected type of powered MHE (e.g. forklift) past the barrier 1700.

The lesser-height regions 1750, 1760, have small height, and thus reduce or eliminate the risk of ground personnel tripping on the barrier, while stepping over the lesser-height regions 1750, 1760. Further, because, in use, the lesser-height regions 1750, 1760 are provided adjacent the side walls of the shipping container, they will be located suitably for use by ground personnel walking past a pallet (or stack of pallets) that is located laterally centrally in the shipping container and which is adjacent the barrier 1700.

There does not appear to be any universally accepted standard for the height of a step that constitutes a substantial tripping hazard, and it will be appreciated many variables apply, including the type (e.g. size, age, degree of infirmity) of the persons traversing the step, and the footwear they may be wearing. However, in the context of the present disclosure, it is believed that the step height of about 11 mm that may result from the use of 11 mm plate to provide the lesser-height regions 1750, 1760 will constitute a substantially reduced tripping hazard compared to the full height of the barrier 1700 or the barrier 600. Indeed, bearing in mind that ground personnel will likely be physically fit, and wearing robust and protective work footwear, providing a lesser height region with a height less than 15 mm, 20 mm, or even 30 mm may still provide a substantially reduced tripping hazard compared to the full height of the barrier 1700 or the barrier 600. If considered desirable or necessary, the tripping hazard may be reduced by suitable shaping of the axial regions other than the full height region relied upon to prevent passage of a powered MHE. For example, in an embodiment, the lateral sides or edges of the lesser-height regions 1750, 1760 (e.g. the base plate portions 1751, 1761) could be bevelled or otherwise shaped to avoid, or reduce the height of, a step provided thereby.

Figure 20:
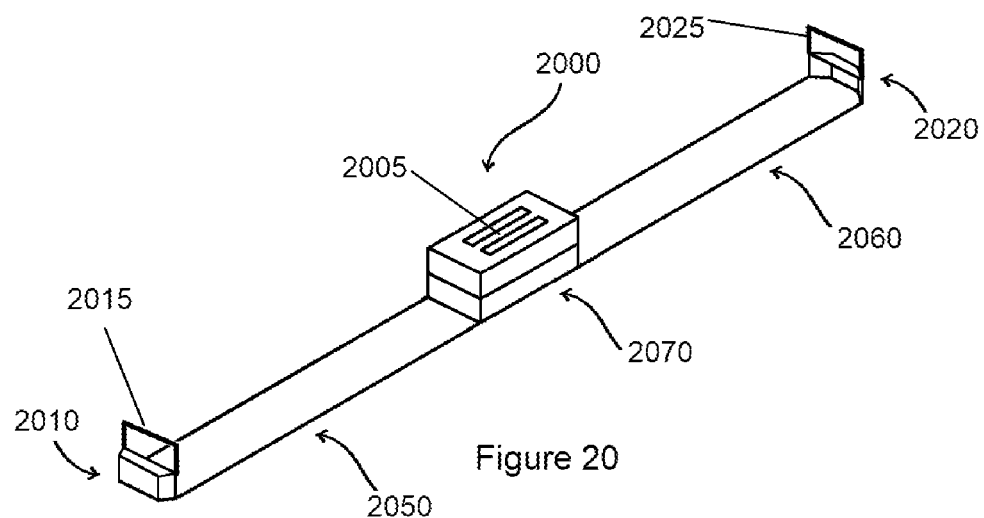
FIGS. 20, 21 and 22 are schematic perspective, side and top plan views, respectively, of a further alternative embodiment, related to the embodiment of FIGS. 17, 18 and 19.
Figure 21:
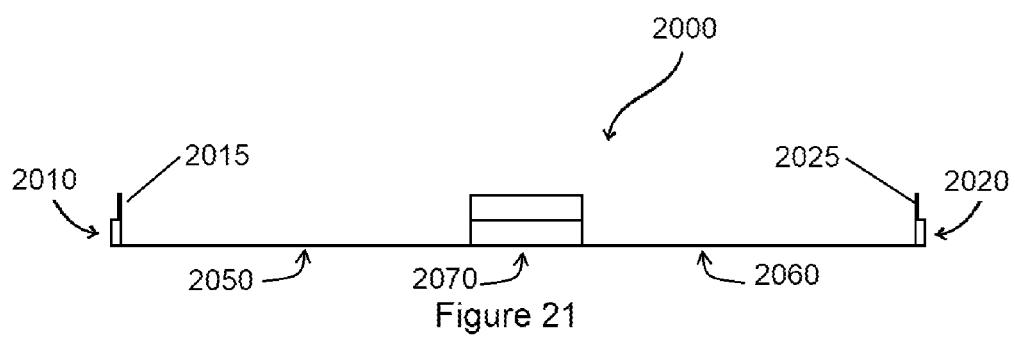
Figure 22:
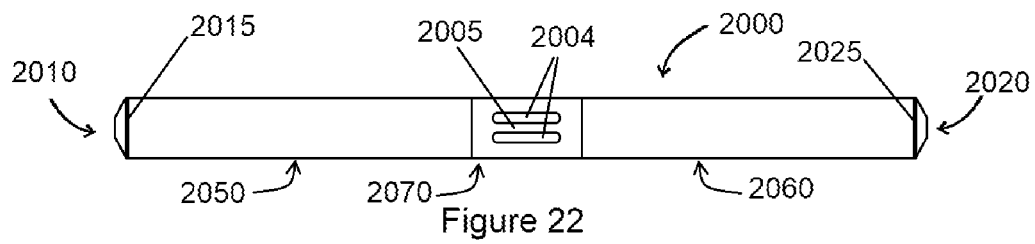
Figure 23:
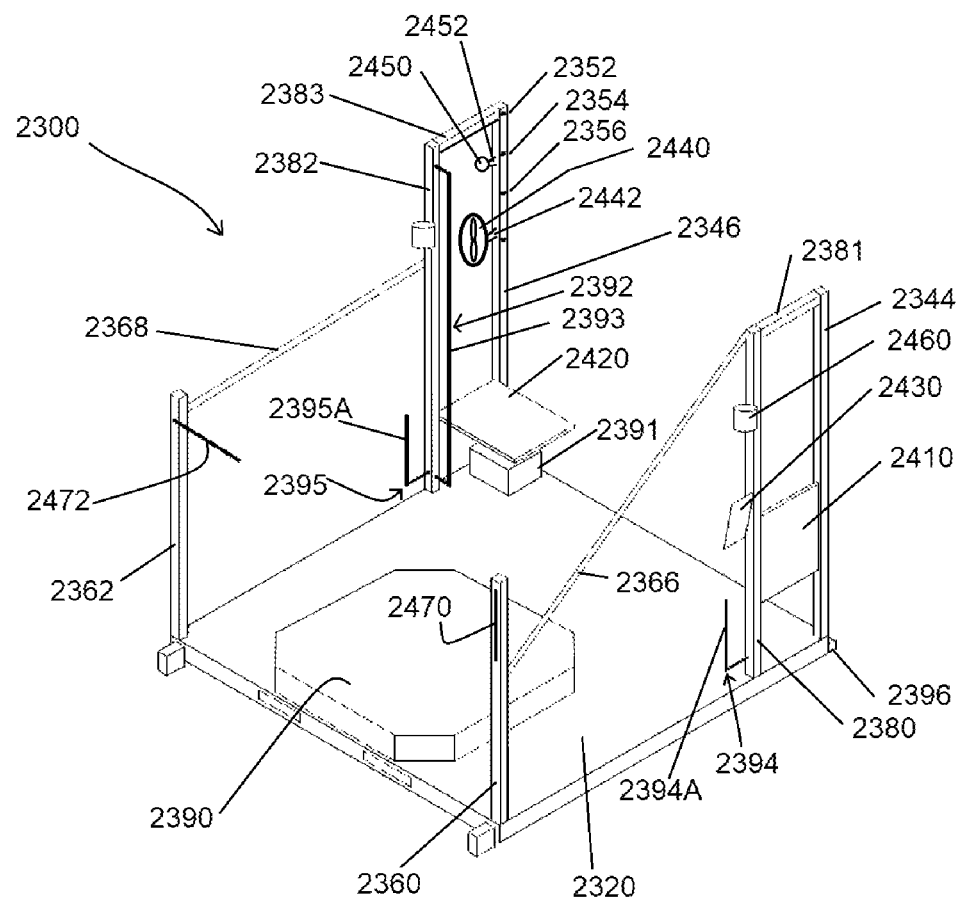
FIG. 23 is a schematic perspective view of an alternative embodiment, related to the embodiment of FIGS. 1 to 4, of an apparatus for packing and unpacking shipping containers in accordance with the present disclosure.

FIGS. 20, 21 and 22 are schematic perspective, side and top plan views, respectively, of an alternative embodiment in the form of a barrier, generally designated 2000, which is in many respects similar to the barrier 1700. The barrier 2000 differs from the barrier 1700 in that a full height region 2070 of the barrier 2000 is axially shorter than the full height region 1770 of the barrier 1700, and lesser-height regions 2050, 2060 of the barrier 2000 are axially longer than lesser-height regions 1750, 1760 of the barrier 1700. The greater length of the lesser-height regions 2050, 2060 assists in reducing the any tripping hazard presented by use of the barrier 2000, compared to the barriers 1700 and 600.

To assist handling of the barrier 2000, an end region 2010 of the barrier is provided with a handle 2015. In the illustrated embodiment the handle 2015 is in the form of a member which projects upwardly from the end region 2010, to provide a generally U-shaped or C-shaped handle, and which is formed from metal. For comfort, the member may be formed of metal that has a rounded transverse cross sectional shape: for example circular, or rectangular but with rounded corners. Providing the handle on an end region of the barrier 2000 allows it to be located substantially flush with a shipping container wall when the barrier 2000 is in use, so that the handle may be upwardly projecting without constituting a tripping hazard. In the illustrated embodiment respective handles 2015, 2025 are provided at each of first and second end regions 2010, 2020, of the barrier 2000. Like the barrier 1700 at least one handle 2005 may be provided in the full height region 2070 of the barrier 2000, in this embodiment at substantially the axial centre of the barrier 2000. The handle 2005 is provided by two slots 2004 in an in-use upper wall of the full height region 2070.

In the illustrated embodiment the barrier 2000 has a length of about 2408 mm (and more generally, for a standard shipping container, between 2388 mm and 2424 mm) and the full height region 2070 has a length of about 330 mm. The length of each of the lesser-height regions 2050, 2060 is about 1 metre. For a type of forklift that might be expected to be used within a shipping container, at least part of the tine- or fork-supporting rails (or other tine- or fork-supporting structure), which as discussed above provide a low ground clearance, will, in use, always be substantially more than 1 metre from the shipping container side wall which is closest to the forklift. Therefore, with the barrier 2000 in use, the full-height region 2070 will be suitably positioned to prevent passage of a forklift that might be expected to be used.

Other than as described above, the barrier 2000 may be substantially the same as the barrier 1700.

The barriers 1700 and 2000 may be of reduced weight compared to the barrier 600. For example, the barrier 2000 may have a weight of approximately 8 kg.

FIGS. 23 to 26 illustrate an alternative embodiment, generally designated of a barrier integrated into a moveable platform, providing a safety apparatus, generally designated

2300. The safety apparatus 2300 which is in many respects similar to the safety apparatus 10 described above, and should be regarded as substantially the same as the safety apparatus 10 other than in features evident from the drawing or specifically described herein. For example, it should be appreciated that the safety apparatus 2300 comprises a wheeled platform 2320, and may incorporate a wheeled substructure 400, substantially as shown in FIG. 4, and described above.

The safety apparatus 2300 differs from the safety apparatus 10 in the number of substantially upright posts provided, and in the provision of a certain enhancements and refinements which may improve functionality, safety and/or practicality.

The safety apparatus 2300 (similarly to the safety apparatus 10) provides first and second rear posts 2344, 2346 located at the rear corners of a working platform 2320, and first and second front posts 2360, 2362 located at the front corners of the working platform 2320. Unlike the safety apparatus 10 the safety apparatus 2300 further provides first and second intermediate posts 2380, 2382, the first intermediate post 2380 being located at one side of the working platform 2320 and between the first front post 2360 and the first rear post 2344 and the second intermediate post 2382 being located at the other side of the working platform 2320 and between the second front post 2362 and the second rear post 2346.

The first and second intermediate posts 2380, 2382, in this embodiment, are spaced about 400 mm forwardly of the respective first and second rear posts 2344, 2346. Upper regions of the first and second intermediate posts 2380, 2382 are connected to upper regions of the respective first and second rear posts 2344, 2346 by respective first and second connecting bars 2381, 2383. The first and second intermediate posts 2380, 2382 are also connected to the respective first and second front posts 2360, 2362 by connecting bars or rails 2366, 2368, which may be inclined (e.g. rail 2366) or substantially horizontal (e.g. rail 2368).

Each of the rear, front and intermediate posts 2344, 2346, 2360, 2362, 2380, 2382 may be is supported by one or more bracing plates (not shown in FIGS. 23 to 26) as should be appreciated from the above description of the safety apparatus 10.

Similarly to the safety apparatus 10, in the safety apparatus 2300 the first and second rear posts 2344, 2346 are each provided with a plurality of vertically spaced attachment points, e.g. 2352, 2354, 2356, for allowing attachment of one or more shoring bars (not shown, but discussed above).

Unlike the safety apparatus 10, the safety apparatus 2300 is provided with a pallet turntable 2390, which is located towards the front of the platform 2320. In the illustrated embodiment the pallet turntable 2390 is electrically powered. Pallet turntables (sometimes called pallet spinners), including electrically powered pallet turntables, are known per se and commercially available, and will therefore not be described in detail herein. Pallet turntables are useful for allowing cartons on a pallet to be wrapped in stretch wrap (stretch film) without requiring a user to repeatedly walk around the pallet. In the illustrated embodiment the electrically powered pallet turntable 2390 is powered by a suitable power supply, illustrated schematically as battery pack 2391, which may be provided in a convenient position on the safety apparatus 2300 (a rear corner, in the illustrated embodiment). Power cables (not shown) may be housed in suitable robust conduits which run along the underside of the platform 2320 between the battery pack 2391 and the pallet turntable 2390.

The safety apparatus 2300 is also provided with a stretch wrap attachment 2392 which includes a roll guide 2393 for guiding movement of a roll of stretch wrap in a substantially vertical direction. The roll guide 2393 is, in this embodiment, in the form of a substantially vertical elongate member attached to the second intermediate post 2382. In use, a stretch wrap dispenser (not shown) which allows a roll of stretch wrap (not shown) to rotate in order to dispense stretch wrap, is supported by the roll guide and is manually moveable up and down the roll guide. Stretch wrap dispensers which include a vertical post-like support (which may be mounted on wheels so that the dispenser can be moved around a pallet) and a dispenser which holds a roll of stretch wrap and can be manually moved up and down the post, are known per se and commercially available, and the wrap attachment 2392 may include a similar structure. Alternatively, the stretch wrap attachment 2392 may utilise a standard hand-held stretch wrap dispenser fitted with a collar or the like which can extend around the roll guide 2393 to allow the stretch wrap dispenser to be retained on, and to be manually moved up and down, the roll guide 2393.

The safety apparatus 2300 may also be provided with one or more stretch roll storage arrangements 2394, 2395, each for holding one or more spare rolls of stretch film. In the illustrated embodiment at least one more stretch roll storage arrangements 2394, 2395 comprises an elongate member 2394A, 2395A, adapted to extend through a central cavity of a roll of stretch film to thereby retain the roll, above, and spaced apart from, the platform 2320. In the illustrated embodiment the elongate member 2394A, 2395A of the or each stretch roll storage arrangements 2394, 2395 is mounted to one of the posts 2344, 2346, 2360, 2362, 2380, 2382 of the safety apparatus 2300, and, in the illustrated embodiment, to one of the posts 2344, 2346, 2380, 2382 in the more rearward part of the apparatus 2300 to allow access by a user while the user remains in the safer, more rearward region.

The safety apparatus 2300 may also be provided with one or more spacers 2396, 2397, which project rearwardly from a rear skirt part 2338 (see FIGS. 25 and 26) of the safety apparatus 2300. In use the spacers 2396, 2397 act to space a rear edge of the platform 2320 from an object, such as stacks of cartons, to thereby reduce the danger of a foot or ankle of a user being inadvertently crushed between the safety apparatus 2300 and the object. The spacers 2396, 2397 may project rearwardly approximately 100 mm to 150 mm. The spacers 2396, 2397 may be fabricated of the same material as the rear skirt part 2338.

The safety apparatus 2300 may also be provided with one or more steps to facilitate access to higher regions inside a shipping container. In the illustrated embodiment a first step 2410 is mounted between the first rear post 2344 and the first intermediate post 2380. The first step 2410 is pivotally mounted to each of the first rear post 2344 and the first intermediate post 2380, so as to be moveable between a substantially vertical storage position and a substantially horizontal, cantilevered, operative position. The step may be mounted in any suitable manner, for example, pivotably about a rod supported by brackets attached, respectively, to the first rear post 2344 and the first intermediate post 2380, with one or more suitable stops provided to restrict the range of angular motion of the step. The first step 2410 is illustrated in its substantially vertical storage position. A second step 2420, similar to the first step 2410 but provided between the second rear post 2346 and the second intermediate post 2382, is illustrated in its substantially horizontal, cantilevered, operative position.

The safety apparatus 2300 may also be provided with a tablet computer holder 2430. Any suitable form of holder may be used. In the illustrated embodiment the tablet computer holder 2430 is mounted to one of the intermediate posts 2380, 2382. Use of a tablet holder can assist a user in data entry related to the loading or unloading of the shipping container, such as data relating to progress at a given time, stock damage and the like.

The safety apparatus 2300 may also be provided with at least one fan 2440. In the illustrated embodiment the fan is mounted, by a bracket 2442, to one of the posts 2344, 2346, 2360, 2362, 2380, 2382 although mounting at any other convenient and/or desired position (such as on one of the connecting bars 2381, 2383 or rails 2366, 2368) is of course possible. The fan 2340 is, in the illustrated embodiment, provided in the more rearward part of the apparatus 2300, which allows use and access by a user while the user remains in the safer, more rearward region. The fan 2340 may have a dedicated battery (not shown) or may be powered by the power supply 2391, in which case a suitable cable (not shown) may be provided internally within a suitable one of the posts 2344, 2346, 2360, 2362, 2380, 2382.

The safety apparatus 2300 may also be provided with at least one light 2450. In the illustrated embodiment the light 2450 is mounted to one of the posts 2344, 2346, 2360, 2362, 2380, 2382 by a bracket 2452, but could be mounted at any other convenient and/or desired position (such as on one of the connecting bars 2381, 2383 or rails 2366, 2368). The light 2450 is, in the illustrated embodiment, provided in the more rearward part of the apparatus 2300, which allows use and access by a user while the user remains in the safer, more rearward region. The light 2450 may have a dedicated battery (not shown) or may be powered by the power supply 2391, in which case a suitable cable (not shown) may be provided internally within a suitable one of the posts 2344, 2346, 2360, 2362, 2380, 2382.

The safety apparatus 2300 may also be provided with at least one holder 2460, for a bottle or other drinking vessel. In the illustrated embodiment the holder 2460 is mounted to one of the posts 2344, 2346, 2360, 2362, 2380, 2382, but could be mounted at any other convenient and/or desired position (such as on one of the connecting bars 2381, 2383 or rails 2366, 2368). The holder 2460 is, in the illustrated embodiment, provided in the more rearward part of the apparatus 2300, to allow use and access by a user while the user remains in the safer, more rearward region.

Although provision of items such as lights, fans and drink holders is technically straightforward, such items can substantially improve user comfort, reduce user fatigue, and consequently may also improve safety and productivity.

The safety apparatus 2300 may also be provided with at least one handle 2470 to assist users in manoeuvring the safety apparatus 2300. In the illustrated embodiment the handle 2470 is provided on one of the front posts 2360, 2362, and is in the form of a member which is pivotally attached to the front post so as to be moveable between a vertical storage position and a substantially horizontal operative position. It will be appreciated that the provision of a substantially horizontal handle at an appropriate height can assist in steering the safety apparatus 2300. In the illustrated embodiment a second handle 2472 is provided on the other of the front posts 2360, 2362, and otherwise corresponds to the first handle 2470.

Figure 24:
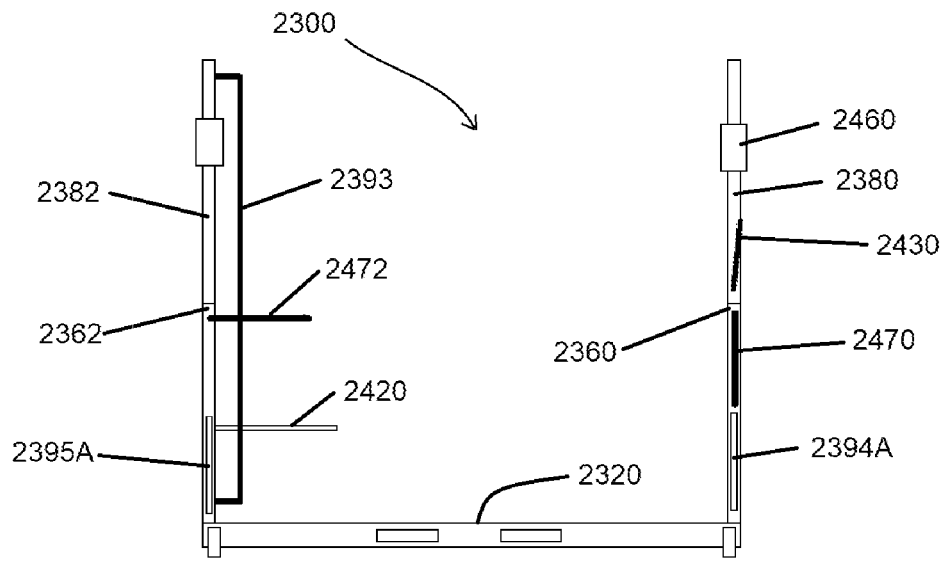
FIG. 24 is a schematic front view, showing some hidden detail, of the apparatus of FIG. 23.
Figure 25:
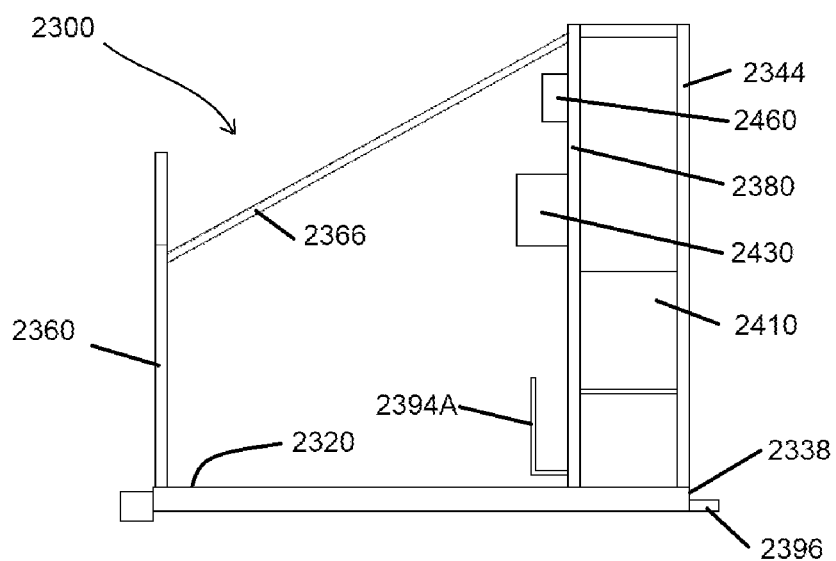
FIG. 25 is a schematic side view of the apparatus of FIG. 23.

It should be appreciated that FIGS. 23 to 26 are schematic, and intended to illustrate features of the disclosed embodiment (taking into account the similarities with the embodiment of FIGS. 1 to 4). For example these Figures do not show the wheels (described in detail in relation to the embodiment of FIGS. 1 to 4), FIGS. 24 and 25 do not show the pallet turntable 2390, and FIG. 24 shows some detail which in a more 'realistic' front view would be obscured by the front posts 2360, 2362.

Figure 26:
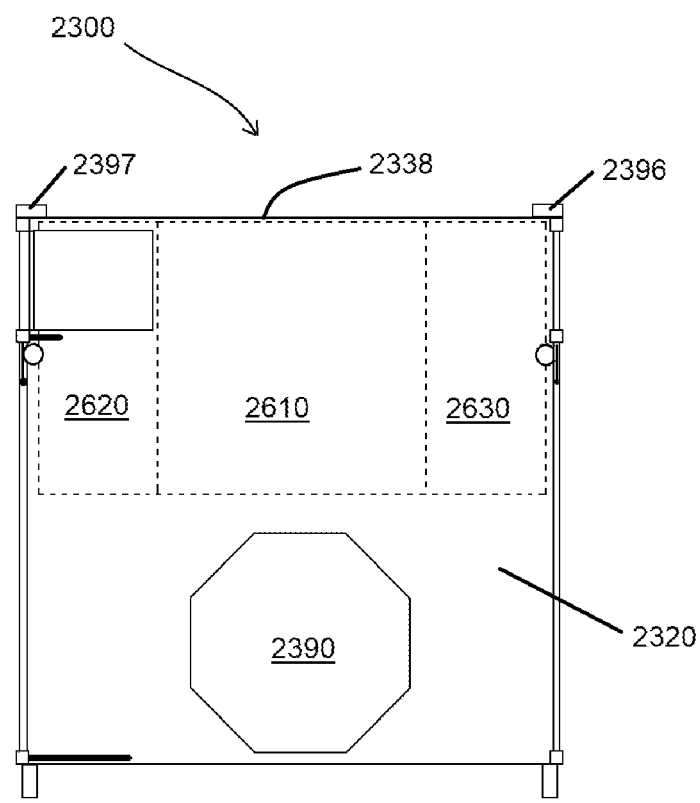
FIG. 26 is a schematic top view of the apparatus of FIG. 23.

As illustrated in FIG. 26 by the use of broken lines, markings may be provided, for example by solid areas of different colours, to indicate the safest areas for workers to stand in, during operation of an MHE in the vicinity of the safety apparatus 2300. Although, as described above the rear part of the platform 2320 is a relatively safe area, there is a possibility that a MHE (forklift) might inadvertently push a pallet (or stack of pallets) towards the rear of the platform 2320. Accordingly, the area directly behind the pallets, designated 2610 (that is, the area directly behind the pallet turntable 2390) is considered less safe than the areas, designated 2620, 2630 in FIG. 26, at the rear of the platform but not central. Accordingly, the area 2610 is designated less safe by use of a warning marking, such as solid red paint, and the areas 2620, 2630 are designated safe by use of a safety marking, such as solid green paint, on the surface of the platform.

Figure 27:
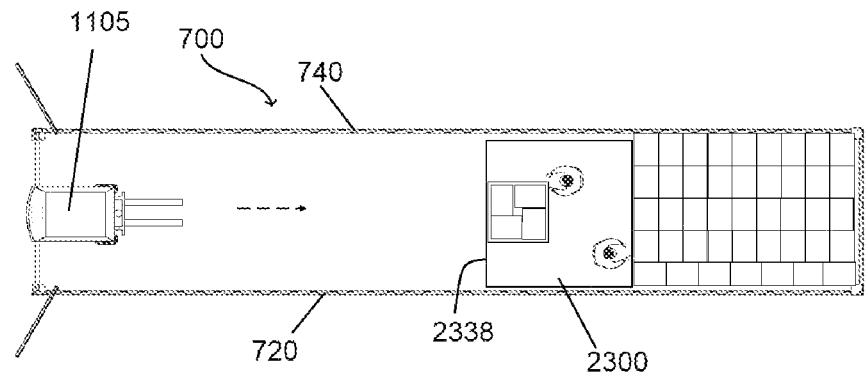
FIG. 27 is a schematic plan view illustration of the apparatus of FIGS. 23 to 26 in use during unpacking of a shipping container.
Figure 28:
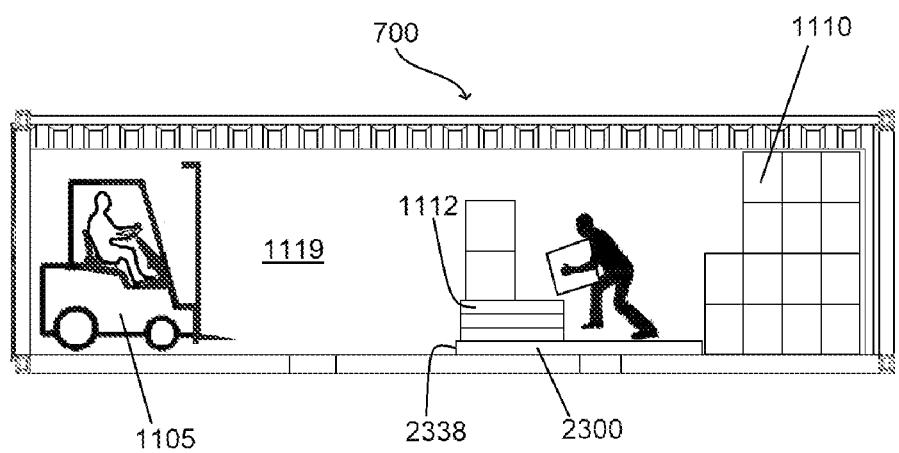
FIG. 28 is a schematic side view illustration of the apparatus of FIGS. 23 to 26 in use during unpacking of a shipping container.
Figure 29:
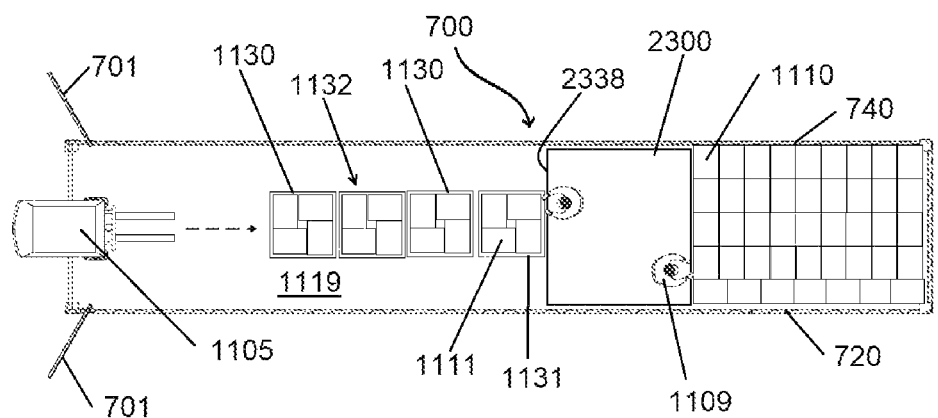
FIG. 29 is a schematic plan view illustration of the apparatus of FIGS. 23 to 26 in use during packing of a shipping container.
Figure 30:
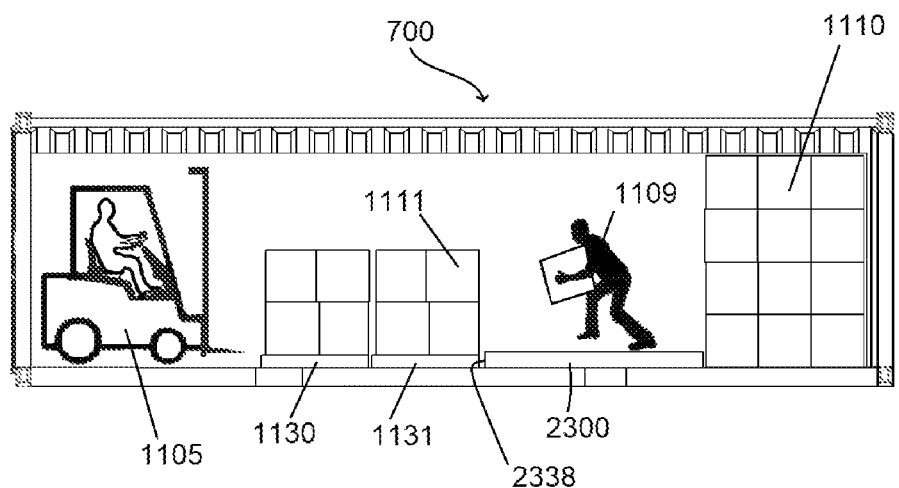
FIG. 30 is a schematic side view illustration of the apparatus of FIGS. 23 to 26 in use during packing of a shipping container.

It will be appreciated that the loading and unloading procedures disclosed above, especially with reference to FIGS. 11 to 14, in relation to the barrier 600 can also be implemented using the safety apparatus 2300. By way of illustration FIGS. 27 and 28 correspond substantially to FIGS. 11 and 12 but illustrate, schematically, use of the safety apparatus 2300 rather than the barrier 600, and FIGS. 29 and 30 correspond substantially to FIGS. 13 and 14, but illustrate, schematically, use of the safety apparatus 2300 rather than the barrier 600. It will be appreciated that a front part 2338 of the safety barrier 2300 effectively performs a blocking function similar to the function of the barrier 600. It will also be appreciated that some variation may be required to accommodate the different apparatus. For example, during packing of a shipping container the barrier 600 could be placed less than 2.2 metres from stacks of cartons 1110, but the front 2338 of the safety apparatus cannot be placed closer to the stacks of cartons 1110 than the front to rear length of the apparatus 2300 allows.

Embodiments disclosed herein can provide substantial advantages compared to at least some prior practices in packing and/or unpacking shipping containers.

Provisions of a working area in a shipping container within which ground personnel are substantially segregated from powered MHEs by a physical barrier can allow incidents of personnel being inadvertently crushed or seriously impacted by forklifts to be avoided or at least substantially reduced.

This is considered to sufficiently reduce the risk of injury from having both ground personnel and a forklift or other powered MHE within a shipping container simultaneously to make this a reasonable working practice, contrary to the situation without the apparatus and methods described herein.

It should be appreciated that further safety benefits stem from use of the apparatus.

Avoiding the need to have personnel exit the container immediately prior to entry by a forklift can reduce the incidence of accidents immediately outside the shipping container.

Further, provision of a relatively safe work area inside the shipping container can allow personnel to wrap the palletised goods in this safe area. Previous practice has sometimes been to load the pallet, remove the loaded pallet from the shipping container and wrap the palletised goods immediately outside the shipping container. The area in which the pallet may be wrapped is often an area from which pallets are collected by forklifts so that wrapping in this area requires ground personnel to be engaged in this task in an area in which forklifts operate, resulting in an increased accident risk. The accident risk is considered lower if the wrapping occurs within the shipping container but in an area into which fork lift trucks and the like cannot enter. Provision of a pallet turntable within the shipping container, and especially provided on, or as part of, a safety apparatus which provides a barrier, can further facilitate wrapping the palletised goods while remaining within this safe area. Provision of a stretch wrap attachment can further facilitate the wrapping, as can the provision of storage for spare rolls of film.

Avoiding the need to have personnel exit the container immediately prior to entry by a forklift can also increase efficiency and, thereby, economy.

Certain embodiments may also assist in reducing the likelihood of fatigue and strain related injury, as previously described.

Of course, the above features or functionalities described in relation to the embodiments are provided by way of example only. Modifications and improvements may be incorporated without departing from the scope of the invention.

For example, certain materials (e.g. aluminium) and structure and dimensions of component parts (e.g. box section members and plates, and their dimensions) of the apparatus are specified in the above description but alternatives may be used.

Further, in relation to the embodiment of FIGS. 1 to 5, a particular form of wheeled subframe is described above but the subframe or chassis may take any desired and practicable form. Further, if desired, the apparatus may be constructed as a 'monocoque' form rather than incorporating a distinct chassis.

Further, in relation to the embodiments of FIGS. 1 to 5 and FIGS. 23 to 30, the braking capability of the described embodiment is provided by wheels (including, in some embodiments, castors) to which brakes can be applied but alternative braking arrangements could be employed: for example, all wheels could be unbraked and separate members used to lock the apparatus in position by engagement with the floor (and/or, if desired, walls and/or roof) of the shipping container. In one embodiment, friction pads are provided on moveable members which are connected to the platform and which can be locked in a lower position so that the friction pads engage the floor to inhibit movement of the apparatus, or in a higher position, so that the friction pads do not engage the floor, to allow movement of the apparatus. Suitable components are commercially available and are often referred to as 'friction pad floor locks'.

Other modifications are, of course, possible without departing from the scope of the invention.

The invention claimed is:

1. A moveable platform for use inside a shipping container in unpacking or packing the shipping container, the moveable platform comprising:

a platform surface upon which a user can stand and move around while unpacking or packing the shipping container, and upon which cargo can also be placed as it is being unpacked from the shipping container by the user or as it is being packed into the shipping container by the user;

at least one barrier part which provides a barrier to wheeled powered material handling equipment moving onto the platform surface; and an arrangement to substantially maintain the moveable platform in a desired position inside the shipping container against forces resulting from impact by powered material handling equipment, the arrangement comprising one or more portions located on opposed sides of the moveable platform that are operable to selectively engage in recesses of respective first and second side walls of the shipping container so as to secure the movable platform against movement within the shipping container.

2. The moveable platform according to claim 1, wherein the barrier part is provided by a height of the platform surface being greater than a vertical step height that can be mounted by the wheeled powered material handling equipment.

3. The moveable platform according to claim 2, wherein the barrier part is provided by a height of the platform surface being at least 100 mm.

4. The moveable platform according to claim 1, wherein the platform surface includes a safety area of the platform surface, the safety area being spaced from the barrier part by at least a length of pallet engaging tines of the powered material handling equipment.

5. The moveable platform according to claim 4, wherein the platform surface further includes a pallet retrieval area of the platform surface adjacent the barrier which is accessible to the pallet engaging tines of the wheeled powered material handling equipment so that a pallet can be placed onto the pallet retrieval area, or retrieved from the parrot retrieval area, by the wheeled powered material handling equipment.

6. The moveable platform according to claim 1, wherein the platform surface has a width direction and a length direction substantially perpendicular to the width direction, and the platform surface is dimensioned to extend in the width direction almost the entire width of the interior of the shipping container.

7. The moveable platform according to claim 6, wherein sufficient clearance from the internal sidewalls of the shipping container is provided to allow the movable platform to be moved in the length direction of the shipping container without interference with the internal sidewalls of the shipping container.

8. The moveable platform according to claim 1, wherein the moveable platform has a width of between 1.5 metres and 2.4 metres, and a length of between 1.5 metres and 2.4 metres.

9. The moveable platform according to claim 1, further comprising a plurality of wheels which allow the movable platform to be manually moved within the shipping container.

10. The moveable platform according to claim 9, wherein the arrangement to substantially maintain the moveable platform in the desired position inside the shipping container further comprises at least one brake associated with a wheel of the apparatus.

11. The moveable platform according to claim 1, wherein the apparatus comprises at least one shoring support member which projects upwardly above a height of the platform surface to facilitate shoring of cargo adjacent the moveable platform.

12. The moveable platform according to claim 11, wherein the apparatus comprises at least two shoring support members, each shoring support member projecting substantially vertically upwards above the height of the platform surface, wherein each shoring support member provides at least one shoring bar attachment structure for facilitating attachment of a shoring bar to said shoring support member.

13. The moveable platform according to claim 12, wherein each shoring support member provides a plurality of shoring bar attachment structures for facilitating attachment of a shoring bar at different heights.

14. The moveable platform according to claim 1, further comprising a powered pallet turntable.

15. The moveable platform according to claim 1, further comprising at least one roll guide for guiding movement of a roll of stretch film.

16. The moveable platform according to claim 1, further comprising one or more of: one or more handrails; a roll storage arrangement for storing one or more rolls of stretch film; at least one fan; at least one light; at least one drink holder; and at least one holder for a tablet computer or other electronic device.

17. The moveable platform according to claim 1, further comprising at least one step higher than the platform surface.

18. The moveable platform according to claim 17, wherein at least one step is movable between a substantially vertical storage position and a substantially horizontal operating position, and when in the substantially horizontal operating position the step is above the platform surface.

19. The moveable platform according to claim 1, further comprising apertures to receive tines of the wheeled powered material handling equipment to enable the moveable platform to be lifted into, and lifted out of, the shipping container by the wheeled powered material handling equipment.

* * * * *